United States Patent
Nishimura

(10) Patent No.: US 7,508,593 B2
(45) Date of Patent: Mar. 24, 2009

(54) BENT TYPE ZOOM OPTICAL SYSTEM, AND IMAGER, INFORMATION PROCESSOR AND ELECTRONIC CAMERA APPARATUS INCORPORATING THE SAME

(75) Inventor: Kazuya Nishimura, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 12 days.

(21) Appl. No.: 11/717,848

(22) Filed: Mar. 13, 2007

(65) Prior Publication Data
US 2007/0217026 A1    Sep. 20, 2007

(30) Foreign Application Priority Data
Mar. 17, 2006   (JP) ............................. 2006-074044

(51) Int. Cl.
    *G02B 15/14* (2006.01)
(52) U.S. Cl. ....................... 359/684; 359/676
(58) Field of Classification Search ........ 359/676, 359/686, 684, 687, 688
    See application file for complete search history.

(56) References Cited
    U.S. PATENT DOCUMENTS
    2008/0278824 A1*  11/2008  Shirota .............. 359/684

FOREIGN PATENT DOCUMENTS

| JP | 08-248318 | 9/1996 |
|---|---|---|
| JP | 09-138347 | 5/1997 |
| JP | 2004-347712 | 12/2004 |

\* cited by examiner

*Primary Examiner*—David N Spector
(74) *Attorney, Agent, or Firm*—Kenyon & Kenyon LLP

(57) ABSTRACT

The invention relates to a bent type zoom optical system comprising a positive first lens group having a reflecting member and remaining fixed upon zooming and a second lens group adapted to move upon zooming, and having a high zoom ratio and a short entire-length, and an imaging apparatus or the like incorporating the same. The zoom optical system comprises the positive first lens group G1 adapted to remain fixed upon zooming and the negative second lens group adapted to move upon zooming. The positive first lens group G1 comprises, in order from the object side, a negative single lens, a reflecting member P and a positive lens unit. The zoom optical system satisfies condition (1) for prevention of fluctuations in the entrance pupil position, condition (2) about the focal length of the first lens group G1, and condition (3) for putting in order the shape of the negative single lens in the first lens group G1.

10 Claims, 25 Drawing Sheets

BENT TYPE ZOOM OPTICAL SYSTEM, AND IMAGER, INFORMATION PROCESSOR AND ELECTRONIC CAMERA APPARATUS INCORPORATING THE SAME

This application claims benefit of Japanese Application No. 2006-74044 filed in Japan on Mar. 17, 2006, the contents of which are incorporated by this reference.

BACKGROUND OF THE INVENTION

The present invention relates generally to a bent type zoom optical system, and more particularly to a bent type zoom optical system that is reduced in terms of the whole size and thickness albeit including a reflecting surface in its optical path and having a high zoom ratio as well as an imaging apparatus, information processor and electronic camera apparatus incorporating the same.

In recent years, imaging apparatus using an electronic imaging device as in the case of digital still cameras have been widely available. With the development and widespread use of digital still cameras, there are now growing demands for high image quality and size reductions in general, and for slimmer zoom optical systems having a higher zoom ratio in particular.

As one approach to slimmer optical systems, a mechanism capable of retracting a part of the optical system out of an optical axis during accommodation has been proposed and put to practical use. However, a high image-quality, high zoom-ratio zoom lens grows large in terms of the entire length and the amount of movement in association with zooming, and so size reductions are hard to achieve even with the use of a complicated lens barrel structure.

Now that a collapsible lens mount type lens barrel renders a dust- and water-proof mechanism sophisticated, a bent type zoom optical system favorable for a dust- and water-proof structure provides means advantageous for the enlargement of the area to be taken. For instance, Patent Publications 1, 2 and 3 have proposed a high zoom-ratio optical system incorporating a bent type optical system.

Patent Publication 1
JP-A-8-248318
Patent Publication 2
JP-A-9-138347
Patent Publication 3
JP-A-2004-347712

These prior publications disclose examples having a zoom ratio of as high as 5 or greater; however, they are still less than satisfactory in terms of size reductions, because the optical entire length is long relative to a telephoto-side optical focal length. On the telephoto side, the entrance pupil position remains deep: there is no option but to increase the volume of the first lens group so as to make sure the quantity of rim rays on the telephoto side (specifically, because off-axis light rays on the telephoto side grow high, prism size must be increased so as to make sure the quantity of rim rays), ending up with an increase in the size of the optical system and apparatus.

SUMMARY OF THE INVENTION

In view of such problems with the prior art as described above, an object of the invention is to provide a bent type zoom optical system having a high zoom ratio and a short entire-length, which comprises a positive first lens unit that remains fixed upon zooming and having a reflection member and a second lens unit that moving upon zooming, and apparatus such as an imaging apparatus incorporating the same.

According to the first aspect of the invention, the aforesaid object is achieved by the provision of a bent type zoom optical system, characterized by comprising, in order from its object side, a positive first lens group adapted to remain fixed upon zooming and a negative second lens group adapted to move upon zooming, wherein said positive first lens group comprises, in order from the object side, a negative single lens, a reflecting member and a positive lens unit, with satisfaction of the following conditions:

$$1 < f_1/|f_2| < 2.8 \tag{1}$$

$$0.1 < f_1/f_t < 0.65 \tag{2}$$

$$1.8 < R_2/f_w < 10 \tag{3}$$

where $f_1$: the focal length of the positive first lens group having a reflecting surface, $f_2$: the focal length of the negative second lens group, $R_2$: the axial radius of curvature of the image-side surface of a negative lens in the first lens group and nearest to the object side thereof, $f_w$: the focal length of the zoom optical system at a wide-angle end, and $f_t$: the focal length of the zoom optical system at a telephoto end.

The advantage of, and the requirement for, the bent type zoom optical system constructed according to the first aspect of the invention is now explained.

Condition (1) is provided for minimizing fluctuations of an entrance pupil position. As the upper limit of 2.8 to this condition is exceeded, it causes the entrance pupil position to fluctuate largely in association with zooming, rendering it difficult to make sure optical performance. As the lower limit of 1 is not reached, it causes the effect of the second group on zooming to grow slender, rendering it hard to increase a zoom ratio.

As the upper limit of 0.65 to condition (2) is exceeded, it causes the entire length of the zoom optical system to grow long, and as the lower limit of 0.1 is not reached, there are aberration fluctuations growing large in association with zooming, rendering it difficult to make sure optical performance.

Condition (3) is provided to put in order the shape of the negative single lens in the first lens group. As the lower limit of 1.8 to this condition is not reached, the optical system must have an increased axial thickness for housing the negative lens in a casing, ending up with an increase in the entire thickness of the optical system. It also causes a refracting power change to grow large in association with the height of light rays incident on the negative single lens, giving rise to large off-axis aberration fluctuations upon zooming and, hence, rendering it difficult to make sure optical performance. As the upper limit of 10 is exceeded, it renders difficult correction of negative distortion at the wide-angle end.

By satisfying such conditions (1), (2) and (3), it is possible to make sure optical performance while the optical entire length is reduced.

According to the second aspect of the invention, there is a bent type zoom optical system provided, which is characterized by comprising, in order from its object side, a positive first lens group that is located nearest to the object side and adapted to remain fixed upon zooming, a second lens group adapted to move monotonously upon zooming, and a third lens group having a stop, wherein said positive first lens group includes a reflecting surface therein, with satisfaction of the following conditions:

$$0 < \Delta_{2G}/f_t < 0.27 \quad (4)$$

$$1 < |f_1/|f_2|| < 3 \quad (1)'$$

where $\Delta_{2G}$: the amount of movement of the second lens group upon zooming from a wide-angle end to a telephoto end (provided that the movement from the object side to an image side is taken as +), $f_t$: the focal length of the zoom optical system at the telephoto end, $f_1$: the focal length of the positive first lens group having a reflecting surface, and $f_2$: the focal length of the negative second lens group.

The advantage of, and the requirement for, the bent type zoom optical system constructed according to the second aspect of the invention is now explained.

As the lower limit of 0 to condition (4) is not reached, it causes the entrance pupil position to go far at the telephoto side, ending up with an increase in the size of the negative lens and reflecting member in the first lens group. As the upper limit of 0.27 is exceeded, it causes the amount of movement of the second lens group to grow relatively large. As a result, the optical entire length cannot be shortened while the angle of incidence of an off-axis chief ray on an imaging plane is kept nearly parallel with an optical axis.

Condition (1)' is provided for minimizing fluctuations of the entrance pupil position. As the upper limit of 3 to this condition is exceeded, it causes the entrance pupil position to fluctuate largely in association with zooming, rendering it difficult to make sure optical performance. As the lower limit of 1 is not reached, it causes the effect of the second group on zooming to grow slender, rendering it hard to increase the zoom ratio.

According to the third aspect of the invention, there is a bent type zoom optical system provided, which is characterized by comprising, in order from its object side, a positive first lens group that is nearest to the object side and adapted to remain fixed upon zooming, and a negative second lens group adapted to move upon zooming, wherein said positive first lens group comprises, in order from the object side, a negative single lens and a prism working as a reflecting member, with satisfaction of the following condition:

$$N_{dp} > 2.0 \quad (5)$$

where $N_{dp}$: the d-line refractive index of a vitreous material used for the prism in the first lens group.

The advantage of, and the requirement for, the bent type zoom optical system constructed according to the third aspect of the invention is now explained.

If the refractive index of the prism having a reflecting surface is increased pursuant to condition (5), it is then possible to make the prism small and make the light rays through the negative single lens low, with the result that off-axis aberrations are prevented from occurring. It is also possible to have a leeway for the total-reflection angle of the prism, thereby achieving effective reflection of off-axis light rays on the wide-angle side. In addition, even with a mechanism for correction of shakes due to the movement of the prism or other element, it is possible to ensure transmission (or incidence) of off-axis light rays to (on) an imaging device.

According to the fourth aspect of the invention, there is a bent type zoom optical system provided, which is characterized by comprising, in order from its object side, a positive first lens group adapted to remain fixed upon zooming, a negative second lens group adapted to move monotonously upon zooming, a positive or negative third lens group adapted to remain fixed upon zooming and having an aperture stop, a positive fourth lens group, and a positive fifth lens group, wherein there is a reflecting surface in said positive first lens group, with satisfaction of the following condition:

$$0.2 < f_1/f_t < 0.65 \quad (2)'$$

where $f_1$: the focal length of the positive first lens group having a reflecting surface, and $f_t$: the focal length of the zoom optical system at the telephoto end.

The advantage of, and the requirement for, the bent type zoom optical system according to the fourth aspect of the invention is now explained.

As the lower limit of 0.2 to condition (2)' is not reached, it causes the refracting power of the first lens group to grow too strong to place correction of the whole aberrations in a well-balanced state, and as the upper limit of 0.65 is exceeded, it causes the optical entire length and front lens diameter to grow large, failing to achieve size and thickness reductions.

According to the fifth aspect of the invention, there is a bent type zoom optical system provided, which is characterized by comprising, in order from its object side, a positive first lens group adapted to remain fixed upon zooming, and a negative second lens group adapted to move toward an image side upon zooming from a wide-angle end to a telephoto end, and further comprising a stop on an image side with respect to said second lens group and a lens group unit A nearest to an image side of the zoom optical system, wherein said lens group unit A comprises, in order from the object side, a positive A1 sub-lens group adapted to move such that it is positioned on the object side at the telephoto end relative to at the wide-angle end, and a positive A2 sub-lens group adapted to move such that it is positioned on an image side, and said positive first lens group comprises, in order from the object side, a negative single lens L1, a reflecting member and a positive lens group, with satisfaction of the following conditions:

$$-1 \leq R_2/R_1 < 0.18 \quad (6)$$

$$0.1 < \beta_2/\beta_a < 0.65 \quad (7)$$

where $R_1$: the axial radius of curvature of the object-side surface of the negative single lens L1, $R_2$: the axial radius of curvature of the image-side surface of the negative single lens L1, $\beta_2$: the combined focal length ratio between the first lens group and the second lens group at the wide-angle and telephoto ends, and $\beta_a$: the focal length ratio ($f_t/f_w$) at the wide-angle and telephoto ends.

The advantage of, and the requirement for, the bent type zoom optical system according to the fifth aspect of the invention is now explained.

The arrangement of this aspect is suitable for a slimmer optical system having reflecting means in the first lens group, wherein the whole optical system is made compact with a zoom ratio increased up to 7 or higher. By locating the principal points of the negative single lens L1 in the first lens group on the object side, it is possible to locate the rear principal point throughout the first lens group on the image side. It is thus possible to narrow down the principal point space between the first lens group and the second lens group at the wide-angle end, thereby easing loads on the second lens group, so that the amount of movement of the second lens group can be minimized, and the second lens group can be simplified as well. Further, by easing loads of the second lens group on zooming, it is possible to minimize the amount of movement of the second lens group, and simplify the arrangement of the second lens group as well. Because of the need of easing the loads of the second lens group on zooming, there is a lot more load applied on zooming by the lens group unit A. For this reason, the space of the lens group unit A from the wide-angle end to the telephoto end is efficiently diminished, and the positive A1 sub-lens group and the positive A2 sub-lens group that are simplifying means are adapted to move at the telephoto end in a direction opposite to that taken at the wide-angle end.

Condition (6) is provided for the location of the principal point position of the negative single lens L1 on the object side. As the lower limit of −1 is not reached, it causes a light beam to spread too much at the reflecting means position, contrary to compactness. Exceeding the upper limit of 0.18 is not preferable because the principal points are located on the image side.

Condition (7) is indicative of how much load the second lens group bears on zooming: as the lower limit of 0.1 is not reached, the zooming function of the second lens group does not work well, resulting in large F-number fluctuations in association with zooming. As the upper limit of 0.65 is exceeded, it causes a lot more load to be applied on the second lens group, resulting in an increase in the amount of its movement, and rendering its construction complicated.

Preferably, the positive A1 sub-lens group comprises, in its image side, a negative lens, a positive lens and a positive lens plus at least one air lens, because the whole lens group unit A has a positive, negative and positive refracting power profile, making sure an efficient lens arrangement.

Between the second lens group and the lens group unit A, the apertures stop, which remains fixed upon zooming, is preferably located. Because the second lens group and the positive A1 sub-lens group move in opposite directions, there is no worsening of space efficiency even with the stop fixed upon zooming. With a stop mechanism remaining fixed, on the other hand, there is an additional advantage that a drive mechanism can be more simplified. Further, around the stop, a lens element that remains fixed upon zooming may just as well be located for making correction of axial aberrations in particular easy. This is preferable because correction of aberrations at the groups adapted to move upon zooming is easy, and assembling is easy as well.

Throughout the aforesaid bent type zoom optical systems, the reflecting member is preferably formed of a plane.

When the reflecting surface is formed of a non-planar surface such as a spherical surface, there are decentration aberrations that must be corrected. When the reflecting member is formed of a prism with entrance and exit surfaces having refracting power, it is difficult to align that prism with other optical element or elements. Further, a reflecting member having refracting power is difficult to fabricate, incurring an added cost.

If the aforesaid arrangements are simultaneously used in any desired combination of two or more, it is then possible to obtain more preferable results.

Likewise, if the aforesaid conditions are applied in any desired combination of two or more, it is then possible to obtain more preferable outcomes.

Each of the aforesaid bent type zoom optical systems according to the invention may be set up in the form of an imaging apparatus comprising an imaging device located at a position for the reception of an object image formed by that bent type zoom optical system.

Each of the aforesaid bent type zoom optical systems according to the invention may also be set up in the form of an information processor that comprises an imaging device located at a position for the reception of an object image formed by that bent type zoom optical system, a CPU adapted to process electronic signals photo-electrically converted by that imaging device, an input portion adapted to receive information signals that an operator wants to enter in the CPU, a display processing means adapted to display an output from the CPU on a display apparatus (for instance, an LCD), and a recording medium for recording an output from the CPU therein, wherein the CPU is adapted to display on the display apparatus an object image received through the bent type zoom optical system at the imaging device.

The information processor here includes a portable terminal (e.g., a cellular phone, or a PDA).

Further, each of the aforesaid bent type zoom optical systems according to the invention may be set up in the form of an electronic camera apparatus that comprises an imaging device located at a position for the reception of an object image formed by that bent type zoom optical system, a CPU adapted to process electronic signals photoelectrically converted by that imaging device, and a display device for displaying an object image received at that imaging device in a visible way, wherein a recording medium (e.g., a memory, a memory card or a DVD ±RW) is incorporated, or inserted or de-inserted, and the CPU comprises a display device adapted to display on the display device an object image received at the imaging device and recording/processing means adapted to record the object image received at the imaging device in the recording medium.

As described above, the present invention provides a bent type zoom optical system that is reduced in terms of the whole size and thickness albeit including one reflecting surface in its optical path and having a high zoom ratio, and an electronic camera or an information processor such as a portable terminal incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Set out below are Examples 1-9 of the bent type zoom optical system according to the invention. FIGS. 1-9 are optical explode views of these examples upon focusing on an infinite object point at the wide-angle end (a), in an intermediate setting (b), and at the telephoto end (c). In FIGS. 1-9, the first lens group G1 is indicated by G1, the second lens group by G2, the third lens group by G3, the fourth lens group by G4, the fifth lens group by G5, an optical path-bending (flexing) prism by P, an aperture stop by S, an optical low-pass filter by F, the cover glass of an electronic imaging device or CCD by C, and the image plane of CCD by I. In FIGS. 1-9, it is noted that the optical path-bending (flexing) prism located as a reflecting member in the first lens group G1 is shown as a plane-parallel plate P with an exploded optical path, and a planar reflecting surface is not shown.

EXAMPLE 1

Figure 1A:
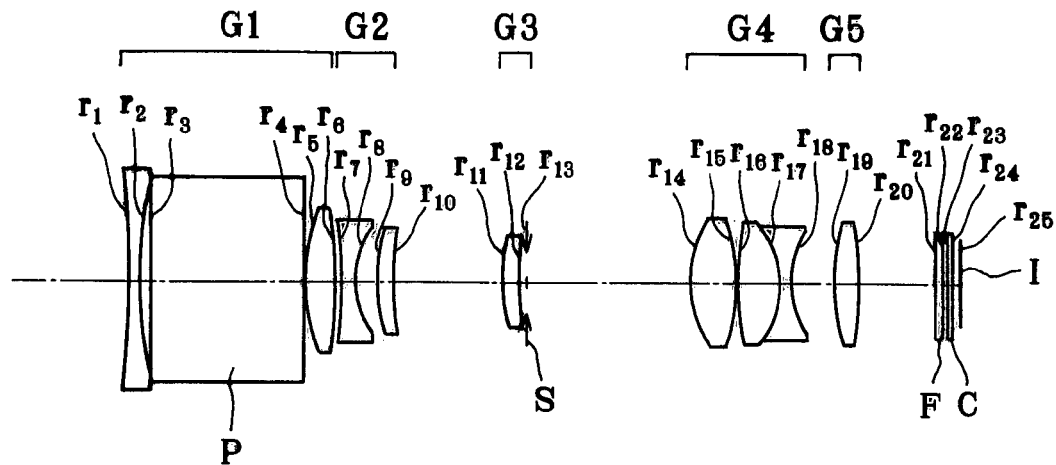
FIG. 1 is illustrative in taken-apart optical path form of Example 1 of the bent type zoom optical system of the invention upon focusing on an infinite object point at the wide-angle end (a), in an intermediate setting (b), and the telephoto end (c).
Figure 1B:
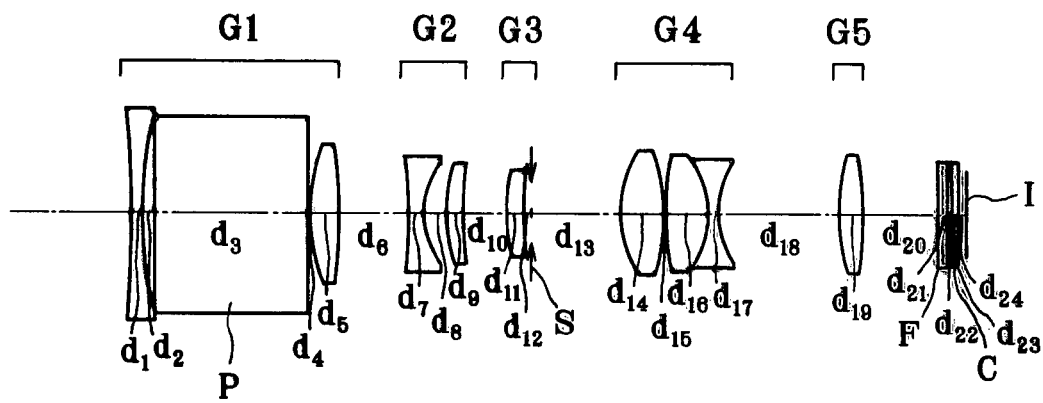
Figure 1C:
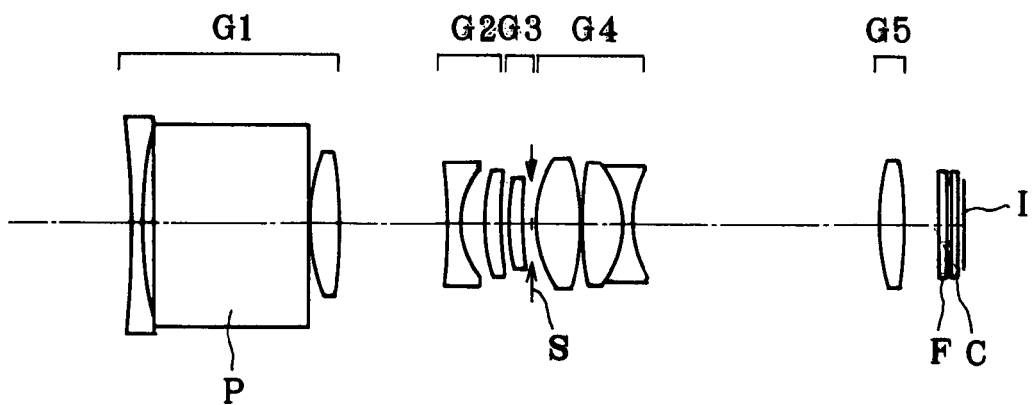

This example is directed to a bent type zoom optical system that, as shown in FIG. 1, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves toward the image side from the wide-angle end to the telephoto end, wherein an optical path is bent by the prism P located in the first lens group G1. By this prism P, the optical path is bent in a camera's longitudinal or transverse direction. Focusing is carried out at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P and a double-convex positive lens; the second lens group G2 is made up of a double-concave negative lens and a positive meniscus lens convex on its object side; the third lens group G3 is made up of a positive meniscus lens convex on its object side and the aperture stop S; the fourth lens group G4 is made up of a double-convex positive lens and a doublet consisting of a double-convex positive lens and a double-concave negative lens; and the fifth lens group G5 is made up of one double-convex positive lens.

Five aspheric surfaces are applied: one for the image-side surface of the double-convex positive lens in the first lens group G1, one for the image-side surface of the double-concave negative lens in the second lens group G2, two for both surfaces of the double-convex positive lens in the fourth lens group G4, and one for the image-side surface of the double-convex positive lens in the fifth lens group G5.

EXAMPLE 2

Figure 2A:
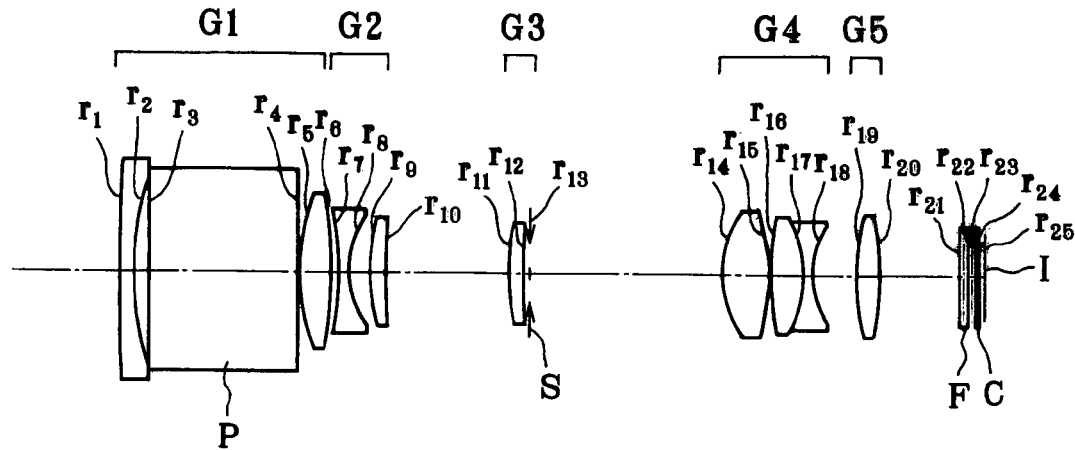
FIG. 2 is illustrative, as in FIG. 1, of Example 2 of the bent type zoom optical system of the invention.
Figure 2B:
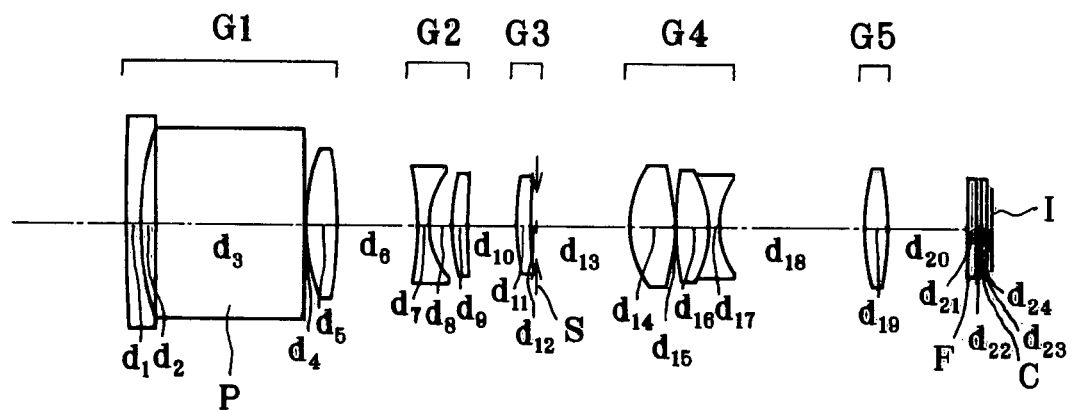
Figure 2C:
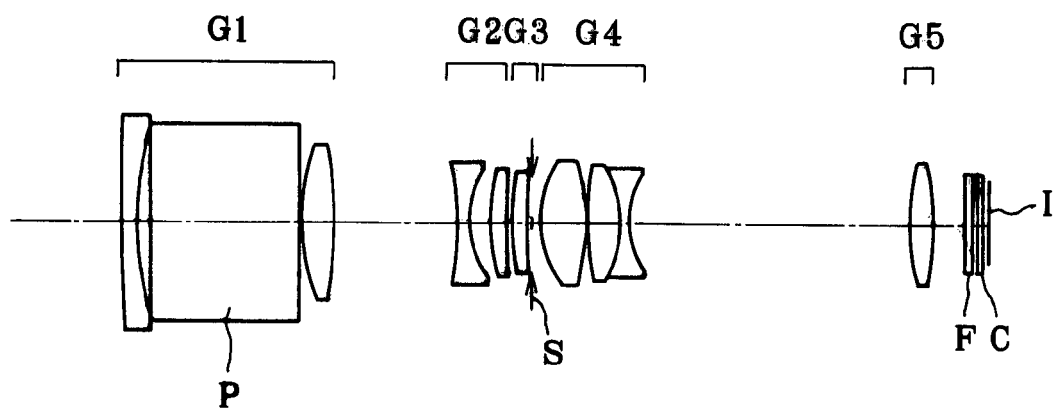

This example is directed to a bent type zoom optical system that, as shown in FIG. 2, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves toward the image side from the wide-angle end to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a negative meniscus lens convex on its object side, the prism P and a double-convex positive lens; the second lens group G2 is made up of a double-concave negative lens and a positive meniscus lens convex on its object side; the third lens group G3 is made up of a positive meniscus lens convex on its object side and the aperture stop S; the fourth lens group G4 is made up of a double-convex positive lens and a doublet consisting of a double-convex positive lens and a double-concave negative lens; and the fifth lens group G5 is made up of one double-convex positive lens.

Five aspheric surfaces are applied: one for the image-side surface of the double-convex positive lens in the first lens group G1, one for the image-side surface of the double-concave negative lens in the second lens group G2, two for both surfaces of the double-convex positive lens in the fourth lens group G4, and one for the image-side surface of the double-convex positive lens in the fifth lens group G5.

EXAMPLE 3

Figure 3A:
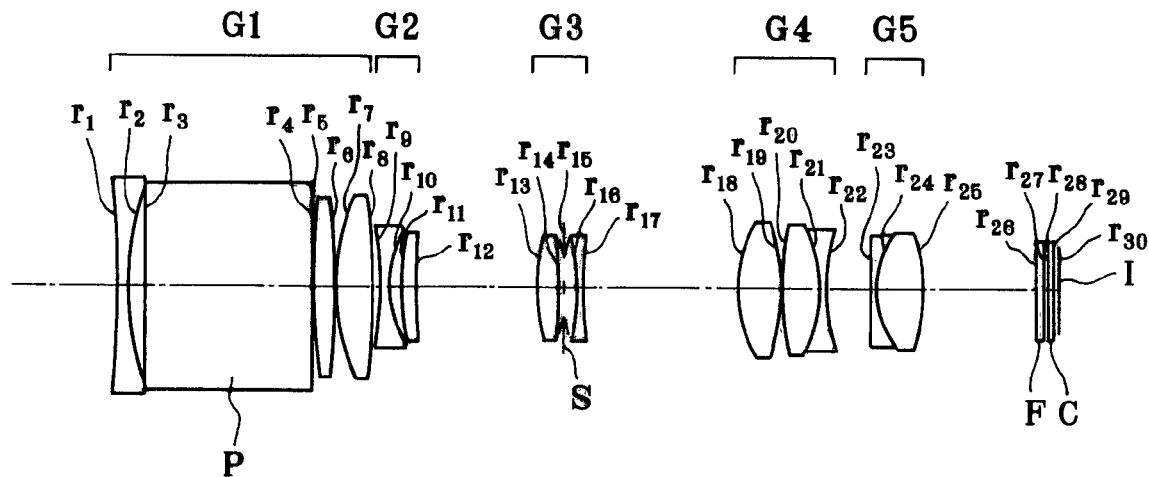
FIG. 3 is illustrative, as in FIG. 1, of Example 3 of the bent type zoom optical system of the invention.
Figure 3B:
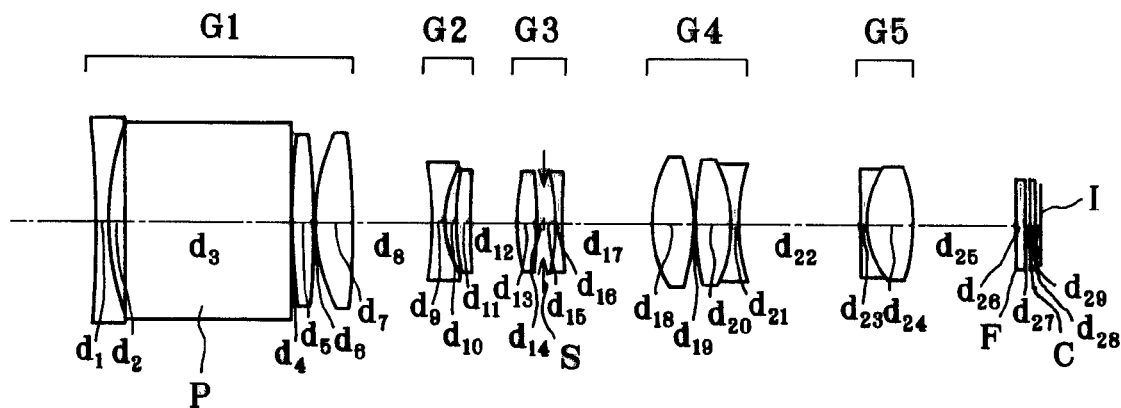
Figure 3C:
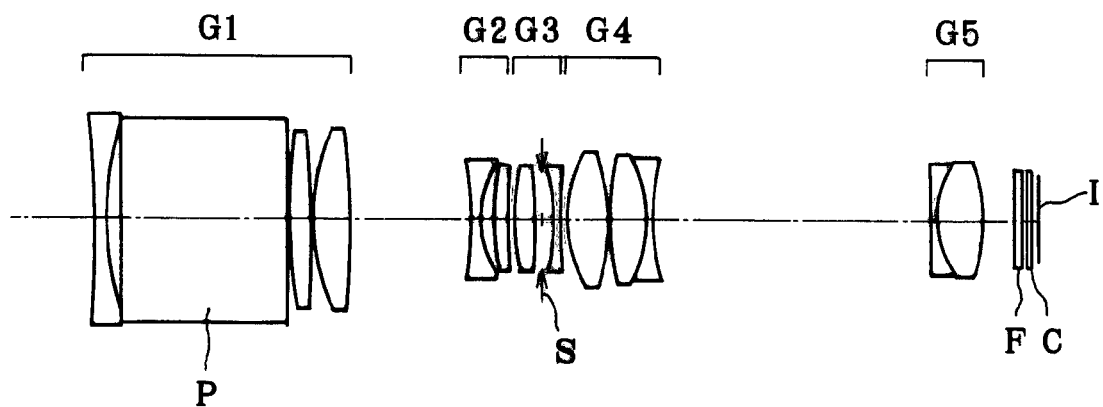

This example is directed to a bent type zoom optical system that, as shown in FIG. 3, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves toward the image side from the wide-angle end to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P, a double-convex positive lens and a double-convex positive lens; the second lens group G2 is made up of a double-concave negative lens and a positive meniscus lens convex on its object side; the third lens group G3 is made up of a double-convex positive lens, the aperture stop S and a double-concave negative lens; the fourth lens group G4 is made up of a double-convex positive lens and a doublet consisting of a double-convex positive lens and a double-concave negative lens; and the fifth lens group G5 is made up of a doublet consisting of a negative meniscus lens convex on its object side and a double-convex positive lens.

Five aspheric surfaces are applied: one for the surface located in the first lens group G1 and nearest to its image side, one for the image-side surface of the double-concave negative lens in the second lens group G2, two for both surfaces of the single lens or double-convex positive lens in the fourth lens group G4, and one for the surface located in the doublet in the fifth lens group G5 and nearest to its image side.

EXAMPLE 4

Figure 4A:
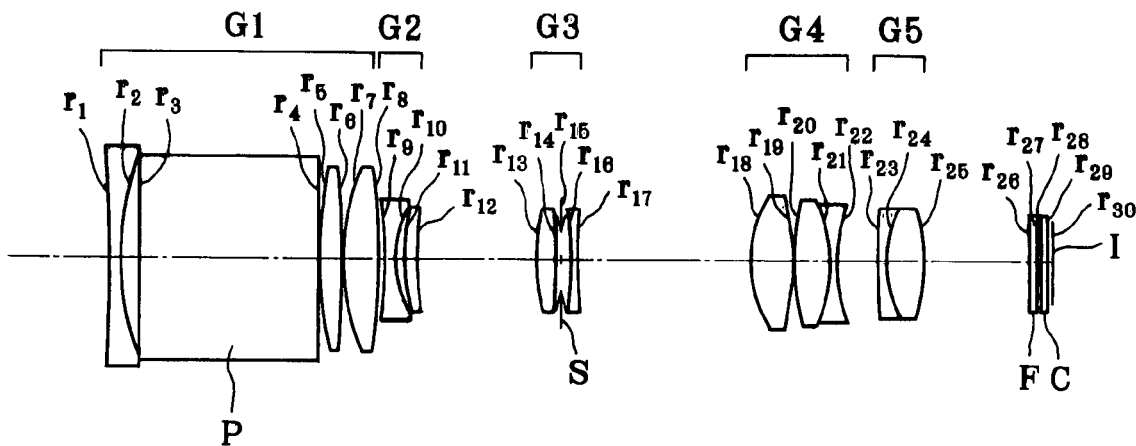
FIG. 4 is illustrative, as in FIG. 1, of Example 4 of the bent type zoom optical system of the invention.
Figure 4B:
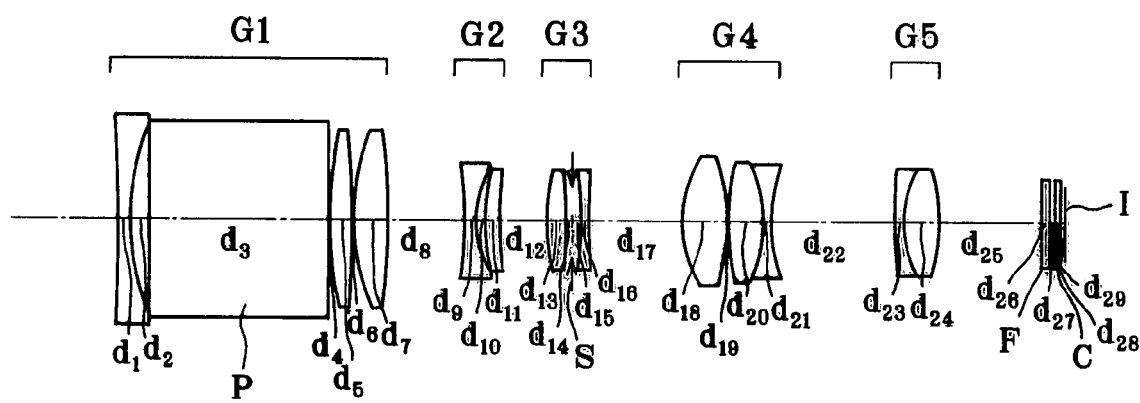
Figure 4C:
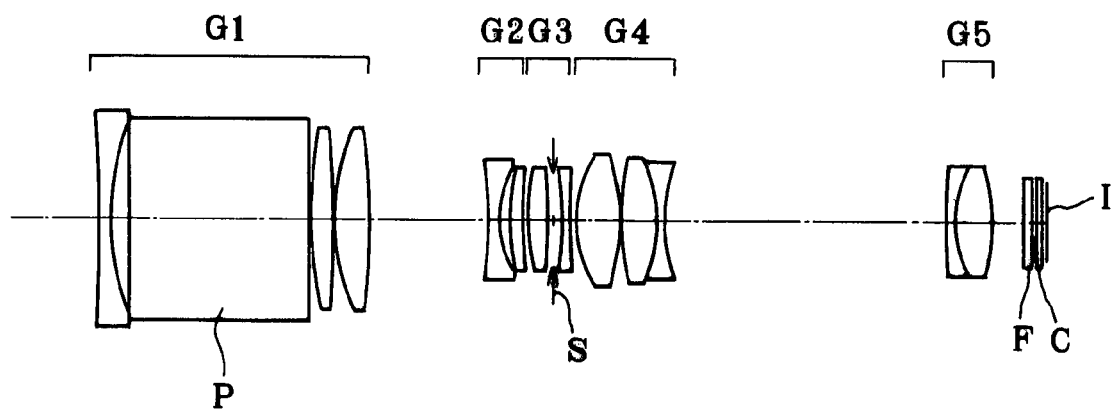

This example is directed to a bent type zoom optical system that, as shown in FIG. 4, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves toward the image side from the wide-angle end to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P, a double-convex positive lens and a double-convex positive lens; the second lens group G2 is made up of a double-concave negative lens and a positive meniscus lens convex on its object side; the third lens group G3 is made up of a double-convex positive lens, the aperture stop S and a double-concave negative lens; the fourth lens group G4 is made up of a double-convex positive lens and a doublet consisting of a double-convex positive lens and a double-concave negative lens; and the fifth lens group G5 is made up of a doublet consisting of a negative meniscus lens convex on its object side and a double-convex positive lens.

Five aspheric surfaces are applied: one for the surface located in the first lens group G1 and nearest to its image side, one for the image-side surface of the double-concave negative lens in the second lens group G2, two for both surfaces of the single lens or double-convex positive lens in the fourth lens group G4, and one for the surface located in the doublet in the fifth lens group G5 and nearest to its image side.

EXAMPLE 5

Figure 5A:
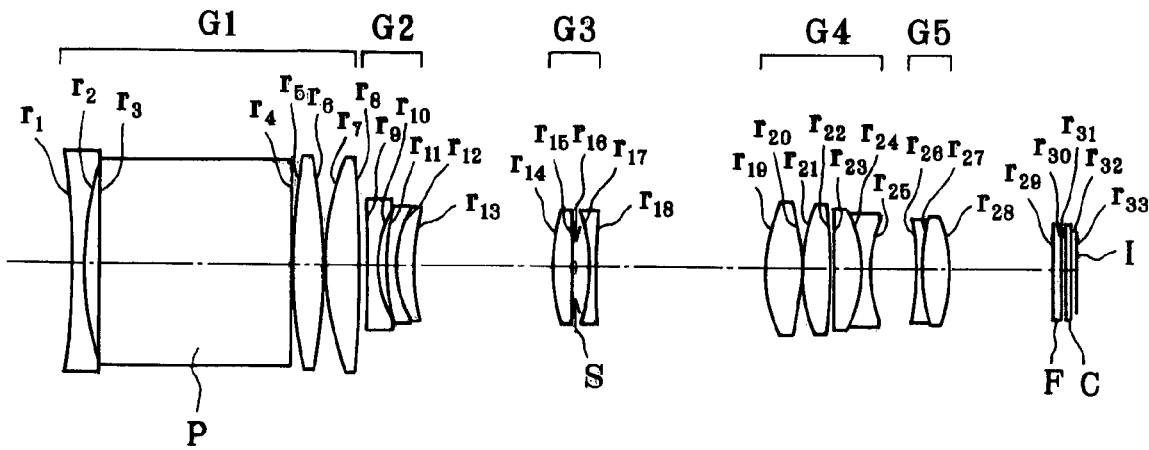
FIG. 5 is illustrative, as in FIG. 1, of Example 5 of the bent type zoom optical system of the invention.
Figure 5B:
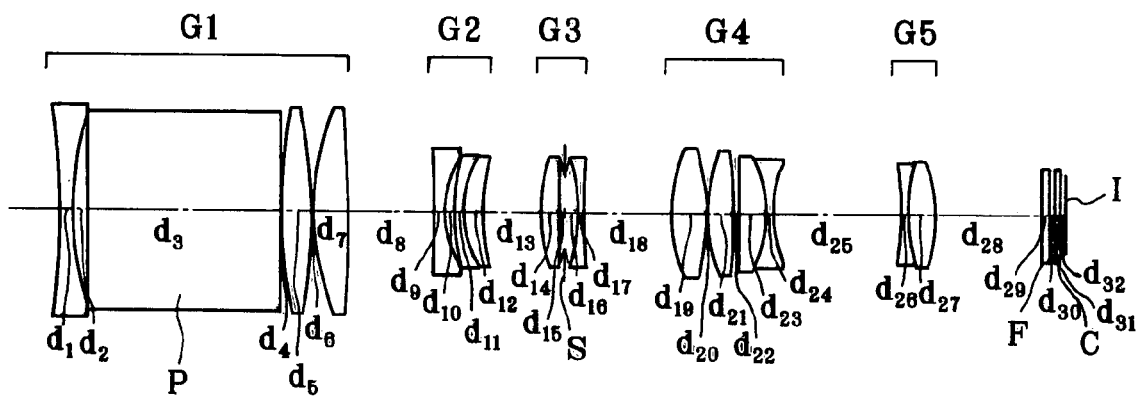
Figure 5C:
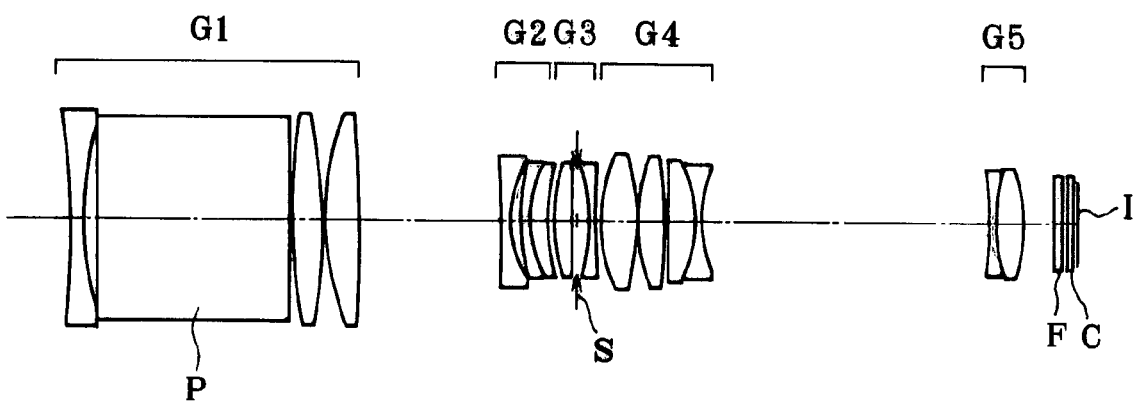

This example is directed to a bent type zoom optical system that, as shown in FIG. 5, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves somewhat toward the object side from the wide-angle end up to an intermediate setting and toward the image side from the intermediate setting to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P, a double-convex positive lens and a double-convex positive lens; the second lens group G2 is made up of a double-concave negative lens and a doublet consisting of a negative meniscus lens convex on its object side and a positive meniscus lens convex on its object side; the third lens group G3 is made up of a double-convex positive lens, the aperture stop S and a double-concave negative lens; the fourth lens group G4 is made up of a double-convex positive lens, a double-convex positive lens and a doublet consisting of a double-convex positive lens and a double-concave negative lens; and the fifth lens group G5 is made up of a doublet consisting of a double-concave negative lens and a double-convex positive lens.

Five aspheric surfaces are applied: one for the object-side surface of the second double-convex positive lens in the first lens group G1, one for the image-side surface of the double-concave negative lens in the second lens group G2, two for both surfaces of the first double-convex positive lens in the fourth lens group G4, and one for the surface located in the doublet in the fifth lens group G5 and nearest to its image side.

EXAMPLE 6

Figure 6A:
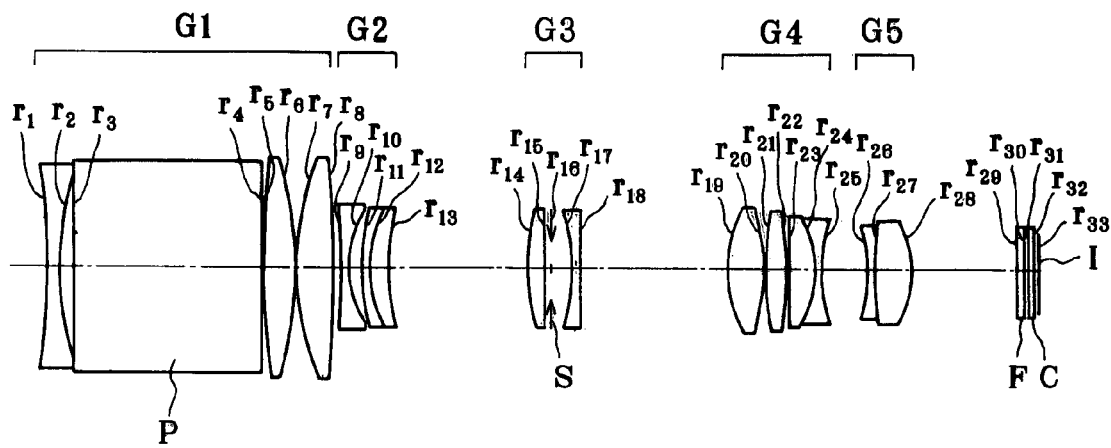
FIG. 6 is illustrative, as in FIG. 1, of Example 6 of the bent type zoom optical system of the invention.
Figure 6B:
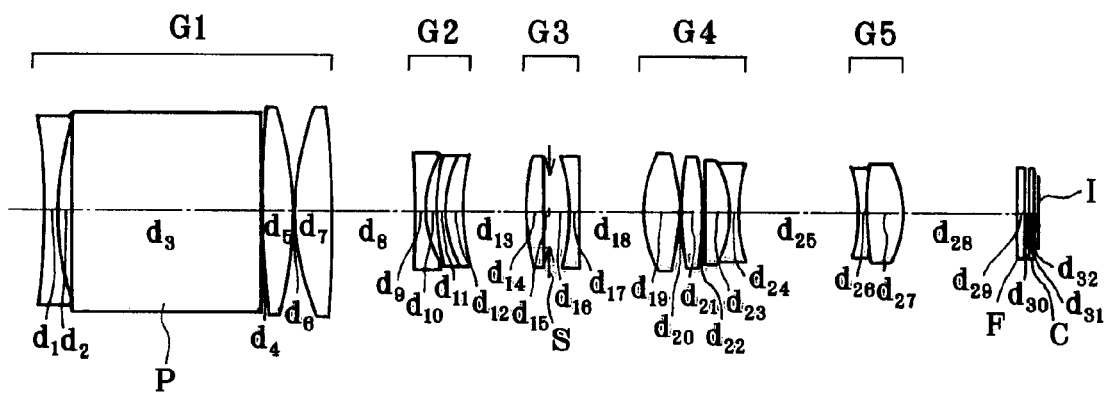
Figure 6C:
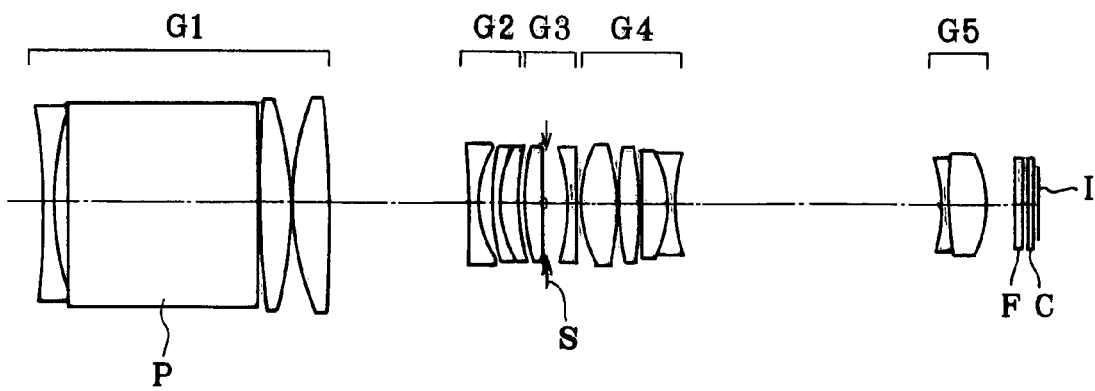

This example is directed to a bent type zoom optical system that, as shown in FIG. 6, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves somewhat toward the object side from the wide-angle end up to an intermediate setting and toward the image side from the intermediate setting to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P, a double-convex positive lens and a double-convex positive lens; the second lens group G2 is made up of a double-concave negative lens and a doublet consisting of a negative meniscus lens convex on its object side and a positive meniscus lens convex on its object side; the third lens group G3 is made up of a double-convex positive lens, the aperture stop S and a double-concave negative lens; the fourth lens group G4 is made up of a double-convex positive lens, a double-convex positive lens and a doublet consisting of a double-convex positive lens and a double-concave negative lens; and the fifth lens group G5 is made up of a doublet consisting of a double-concave negative lens and a double-convex positive lens.

Seven aspheric surfaces are applied: two for both surface of the second double-convex positive in the first lens group G1, two for both surfaces of the double-concave negative lens in the second lens group G2, two for both surfaces of the first double-convex positive lens in the fourth lens group G4, and one for the surface located in the doublet in the fifth lens group G5 and nearest to its image side.

EXAMPLE 7

Figure 7A:
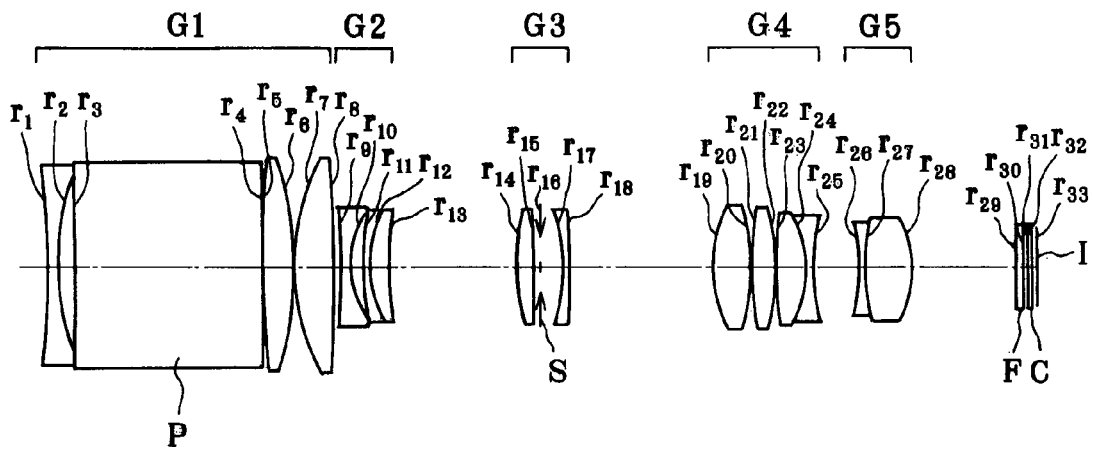
FIG. 7 is illustrative, as in FIG. 1, of Example 7 of the bent type zoom optical system of the invention.
Figure 7B:
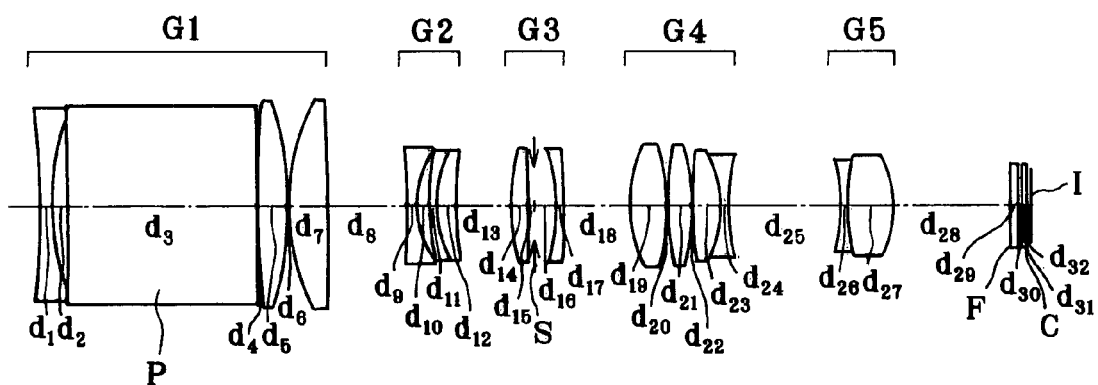
Figure 7C:
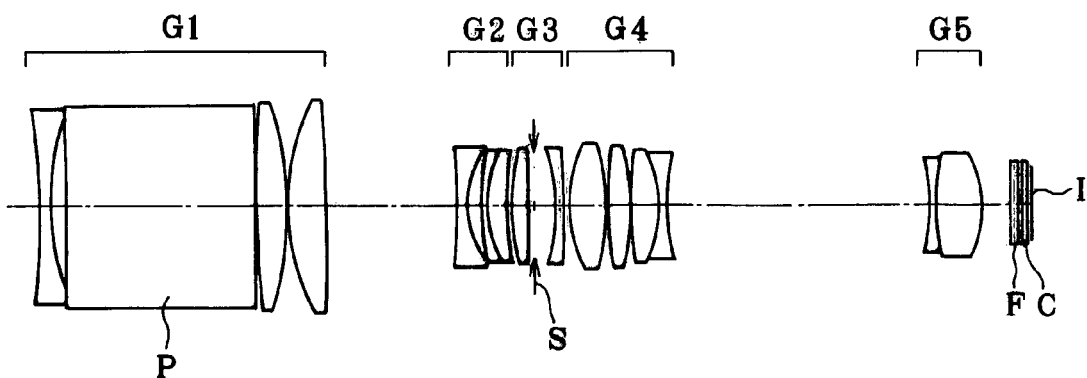

This example is directed to a bent type zoom optical system that, as shown in FIG. 7, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves somewhat toward the object side from the wide-angle end up to an intermediate setting and toward the image side from the intermediate setting to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P, a double-convex positive lens and a double-convex positive lens; the second lens group G2 is made up of a double-concave negative lens and a doublet consisting of a negative meniscus lens convex on its object side and a positive meniscus lens convex on its object side; the third lens group G3 is made up of a double-convex positive lens, the aperture stop S and a negative meniscus lens convex on its object side; the fourth lens group G4 is made up of a double-convex positive lens, a double-convex positive lens and a doublet consisting of a double-convex positive lens and a double-concave negative lens; and the fifth lens group G5 is made up of a doublet consisting of a double-concave negative lens and a double-convex positive lens.

Five aspheric surfaces are applied: one for the object-side surface of the second double-convex positive lens in the first lens group G1, one for the image-side surface of the double-concave negative lens in the second lens group G2, two for both surfaces of the first double-convex positive lens in the fourth lens group G4, and one for the surface located in the doublet in the fifth lens group G5 and nearest to its image side.

EXAMPLE 8

Figure 8A:
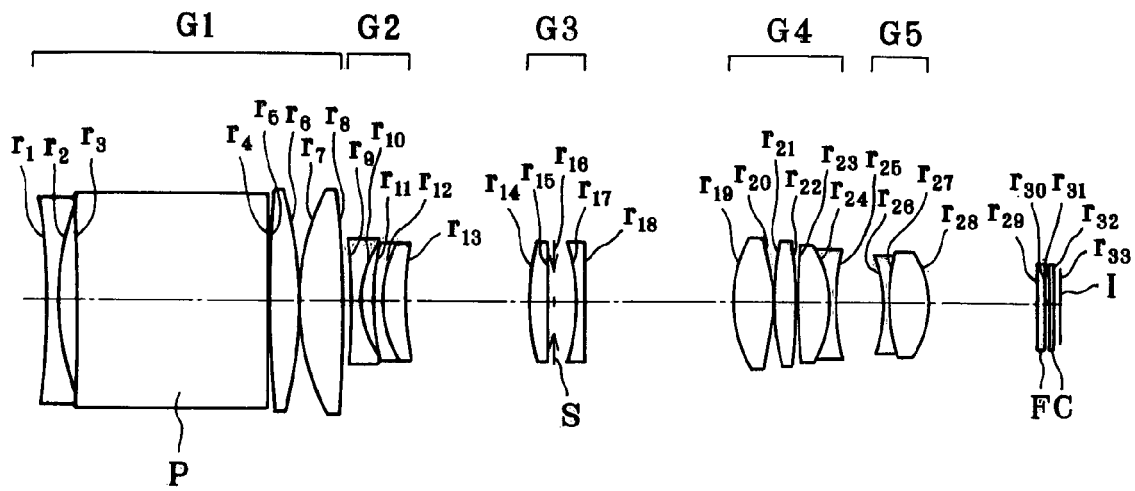
FIG. 8 is illustrative, as in FIG. 1, of Example 8 of the bent type zoom optical system of the invention.
Figure 8B:
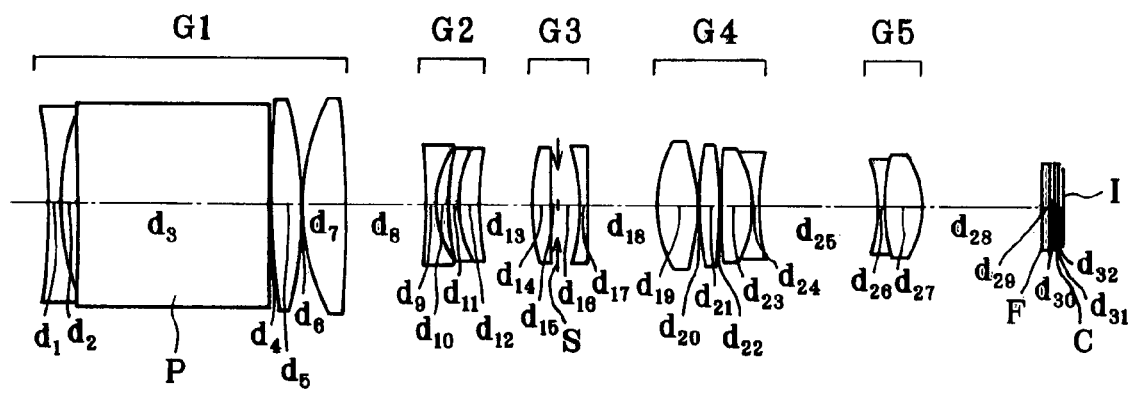
Figure 8C:
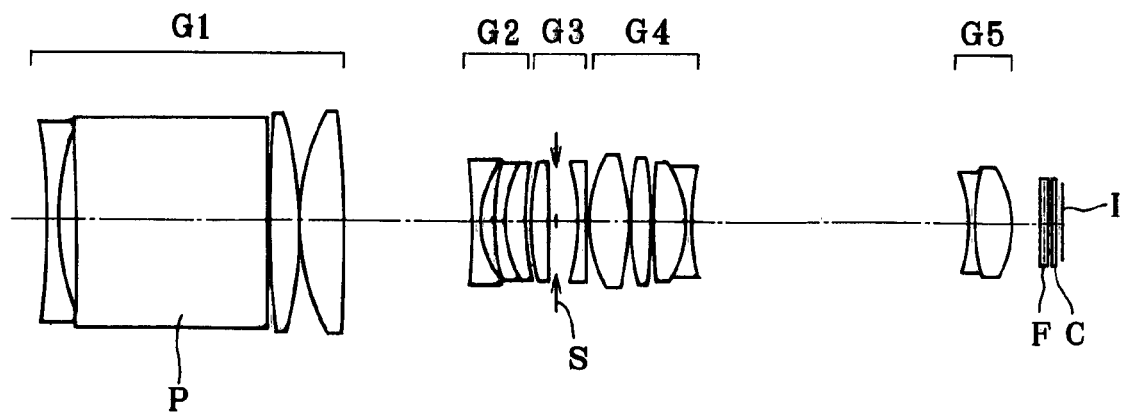

This example is directed to a bent type zoom optical system that, as shown in FIG. 8, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves somewhat toward the object side from the wide-angle end up to an intermediate setting and toward the image side from the intermediate setting to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P, a double-convex positive lens and a double-convex positive lens; the second lens group G2 is made up of a double-concave negative lens and a doublet consisting of a negative meniscus lens convex on its object side and a positive meniscus lens convex on its object side; the third lens group G3 is made up of a double-convex positive lens, the aperture stop S and a double-concave negative lens; the fourth lens group G4 is made up of a double-convex positive lens, a double-convex positive lens and a doublet consisting of a double-convex positive lens and a double-concave negative lens; and the fifth lens group G5 is made up of a doublet consisting of a double-concave negative lens and a double-convex positive lens.

Six aspheric surfaces are applied: two for both surface of the second double-convex positive in the first lens group G1, one for the image-side surface of the double-concave negative lens in the second lens group G2, two for both surfaces of the first double-convex positive lens in the fourth lens group G4, and one for the surface located in the doublet in the fifth lens group G5 and nearest to its image side.

EXAMPLE 9

Figure 9A:
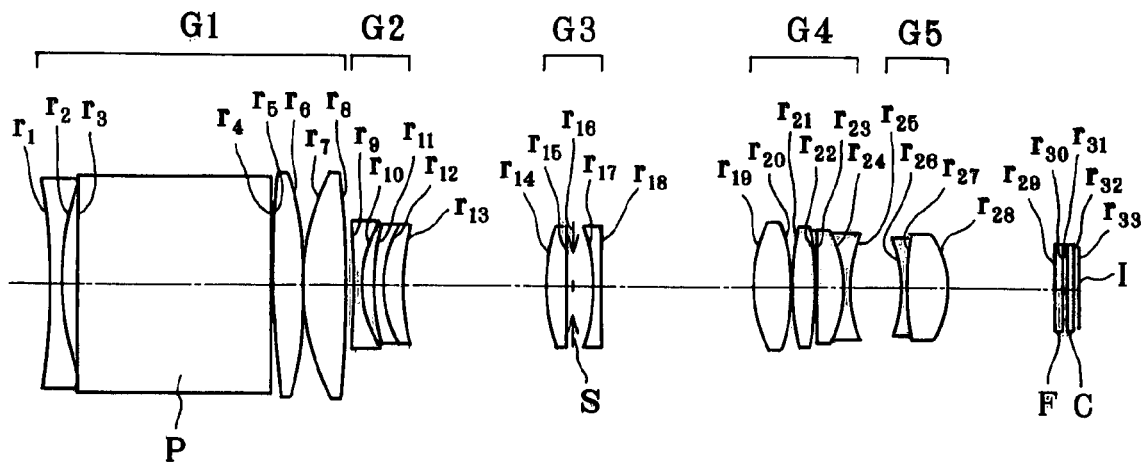
FIG. 9 is illustrative, as in FIG. 1, of Example 9 of the bent type zoom optical system of the invention.
Figure 9B:
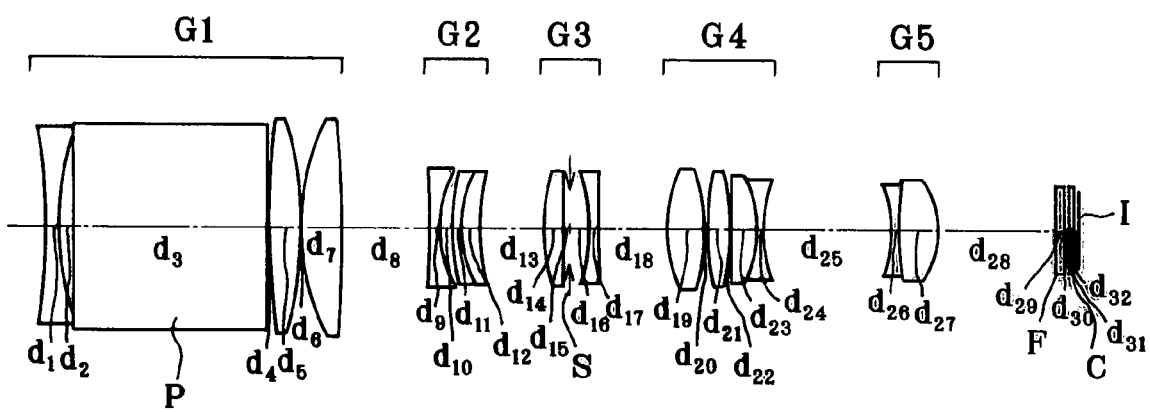
Figure 9C:
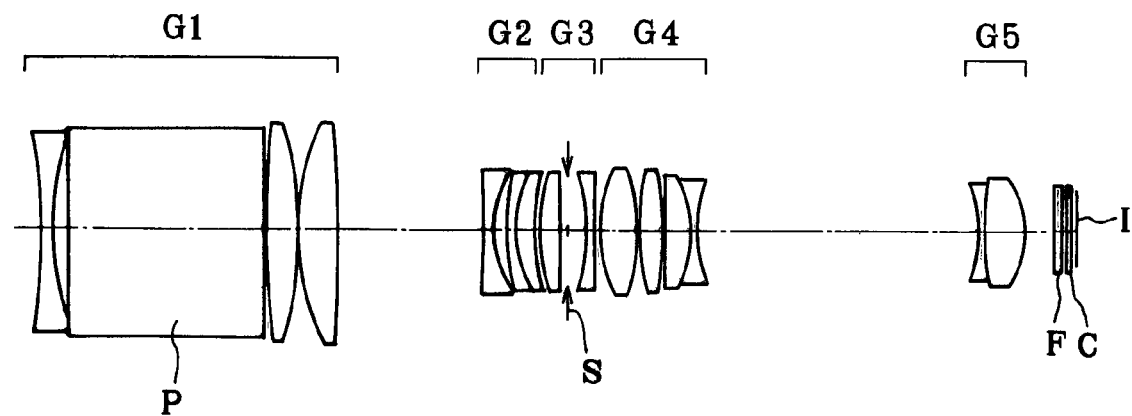
Figure 10A:
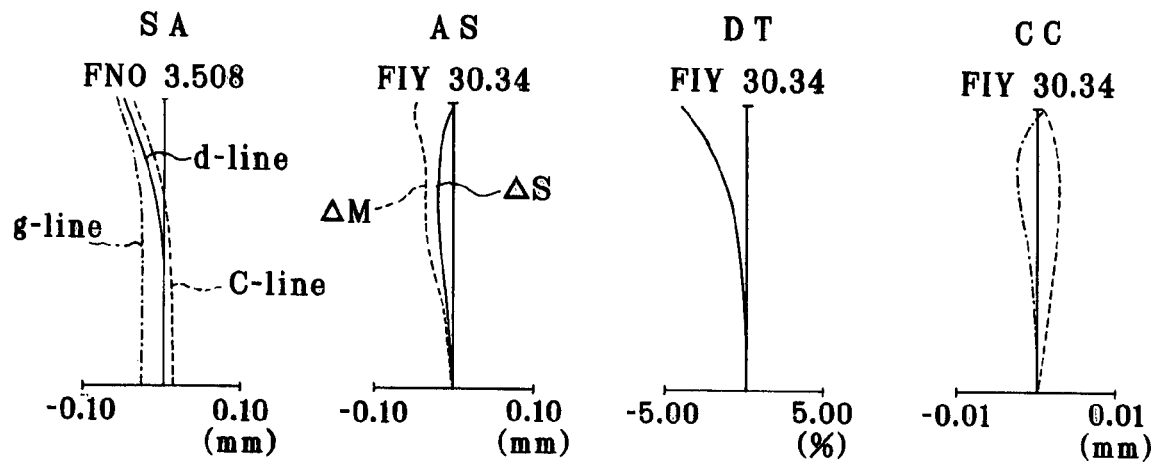
FIG. 10 is indicative of aberrations for Example 1 upon focusing on an infinite object point at the wide-angle end (a), in the intermediate setting (b), and at the telephoto end (c).
Figure 10B:
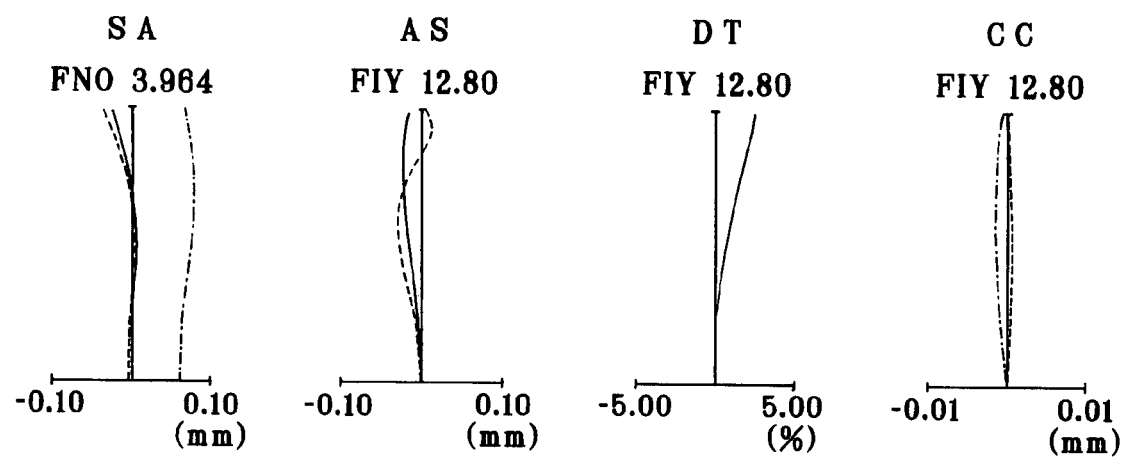
Figure 10C:
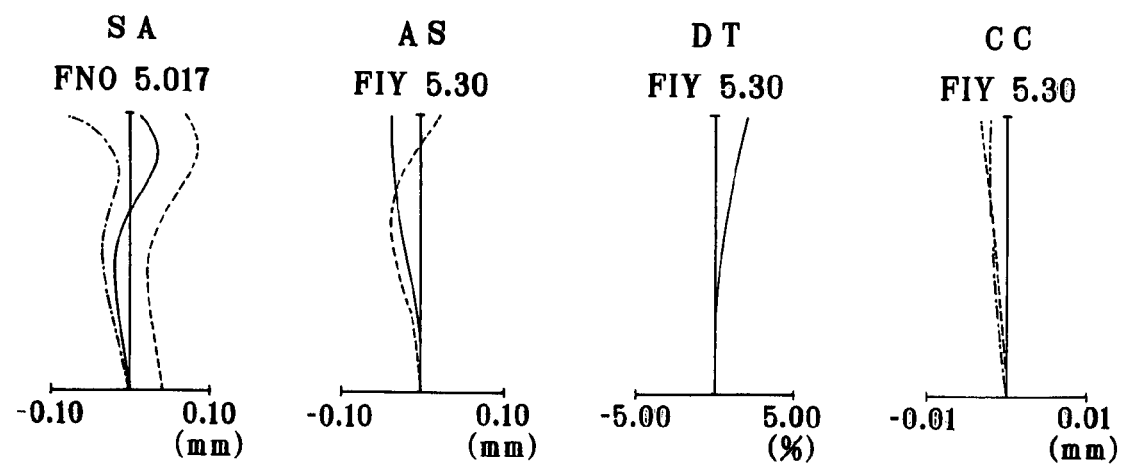
Figure 11A:
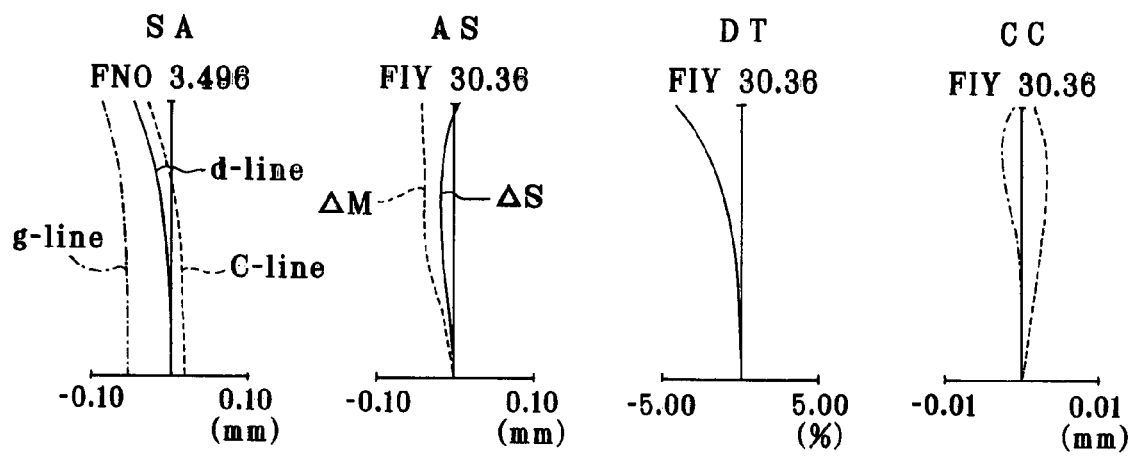
FIG. 11 is indicative, as in FIG. 10, of aberrations for Example 2.
Figure 11B:
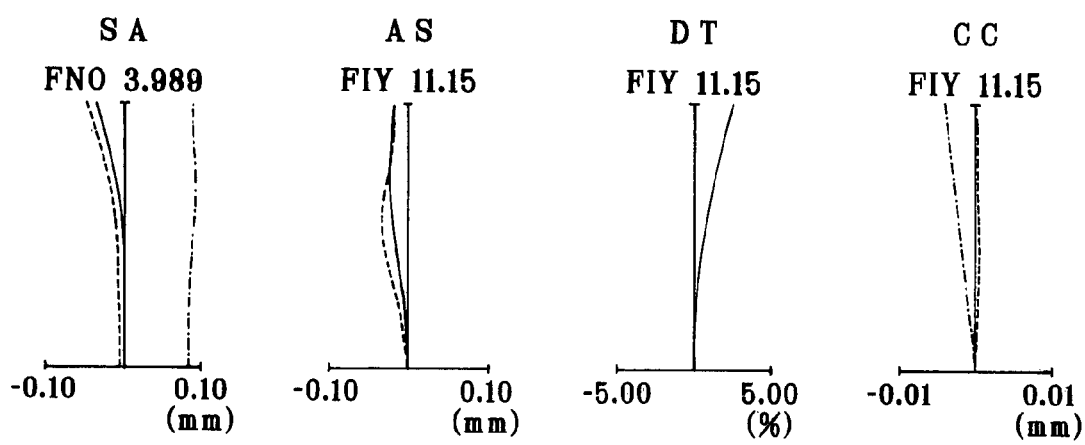
Figure 11C:
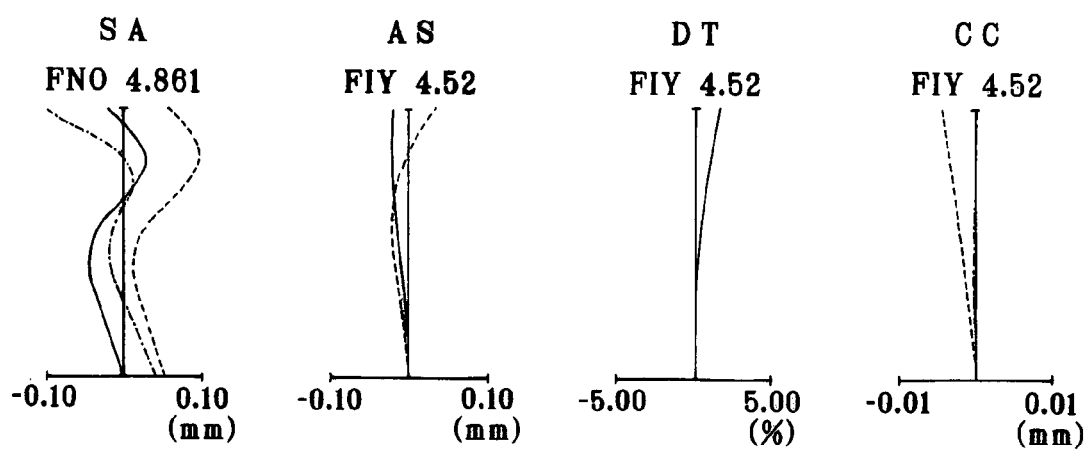
Figure 12A:
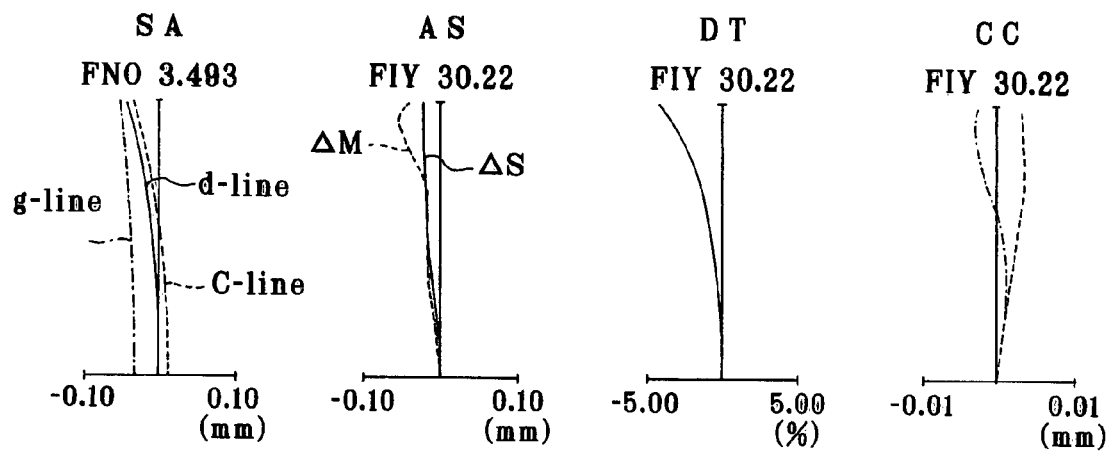
FIG. 12 is indicative, as in FIG. 10, of aberrations for Example 3.
Figure 12B:
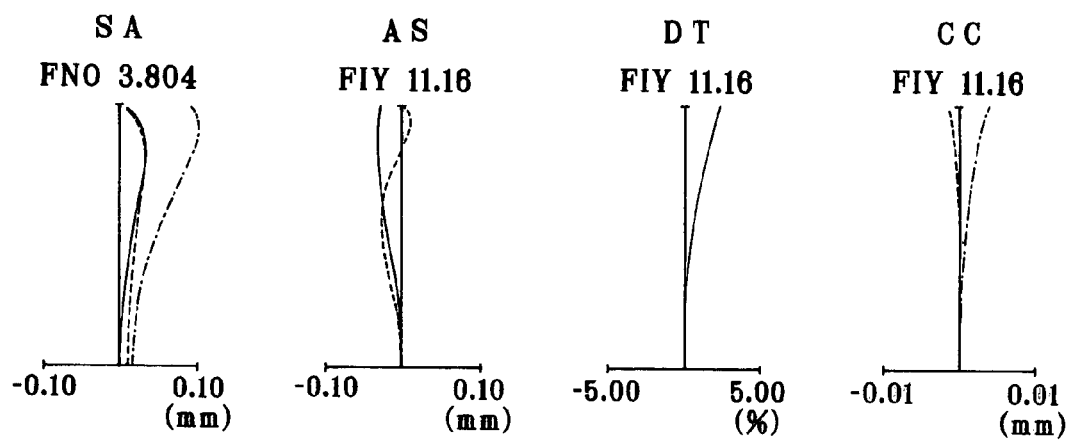
Figure 12C:
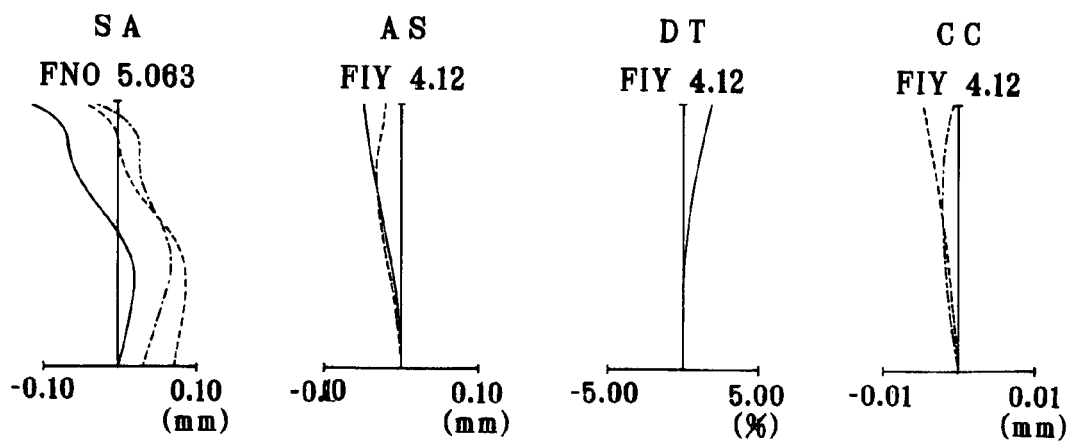
Figure 13A:
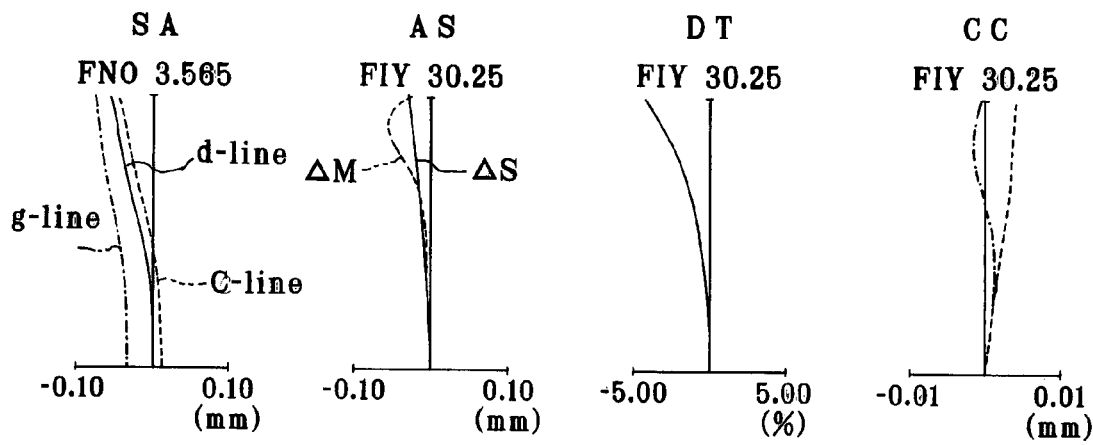
FIG. 13 is indicative, as in FIG. 10, of aberrations for Example 4.
Figure 13B:
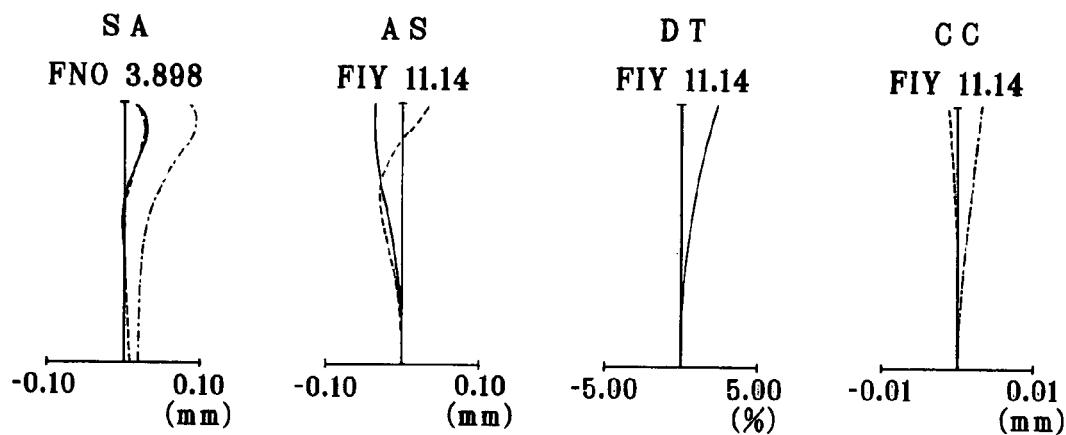
Figure 13C:
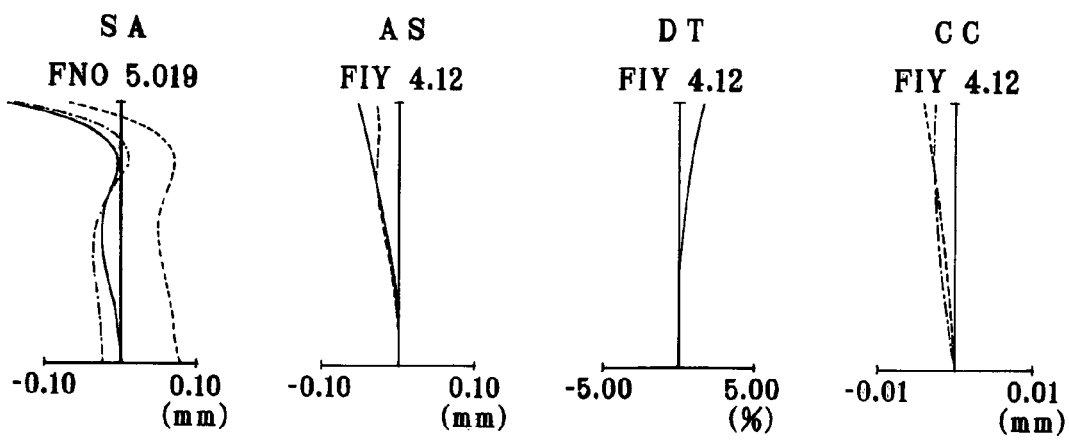
Figure 14A:
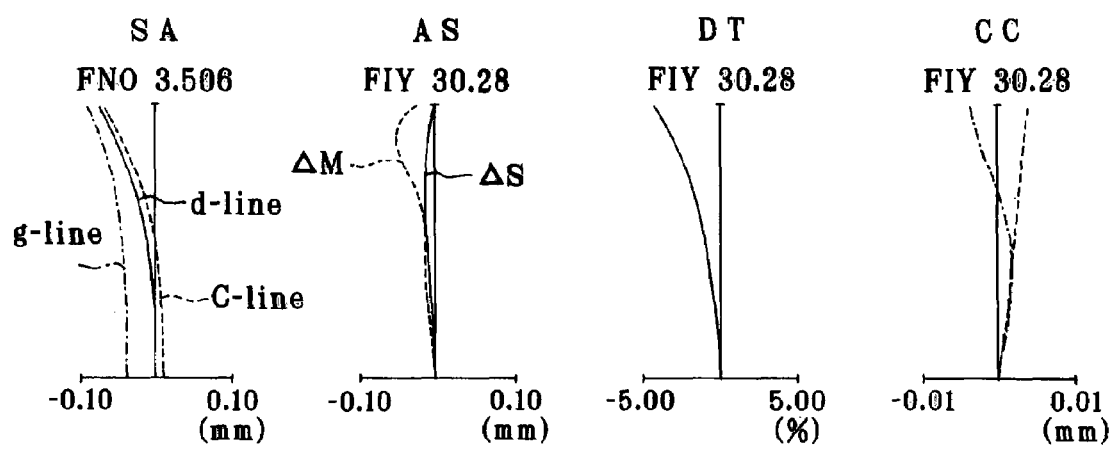
FIG. 14 is indicative, as in FIG. 10, of aberrations for Example 5.
Figure 14B:
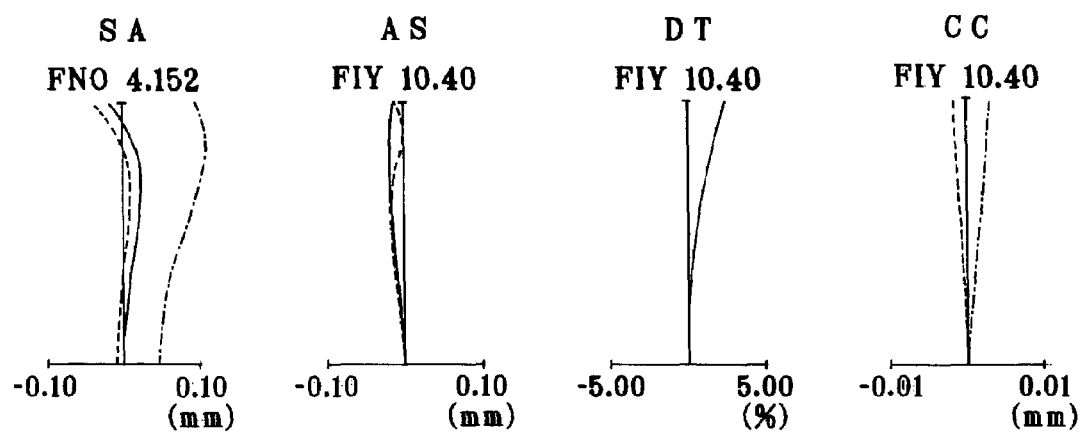
Figure 14C:
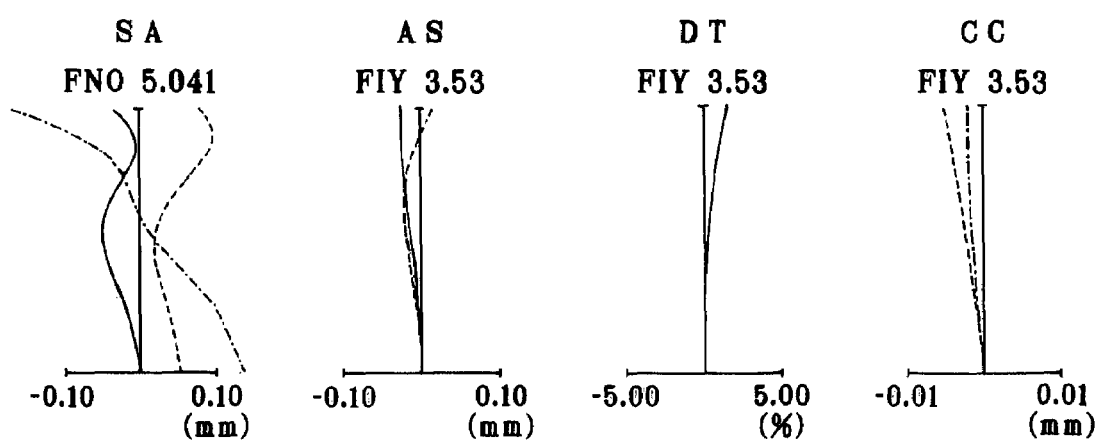
Figure 15A:
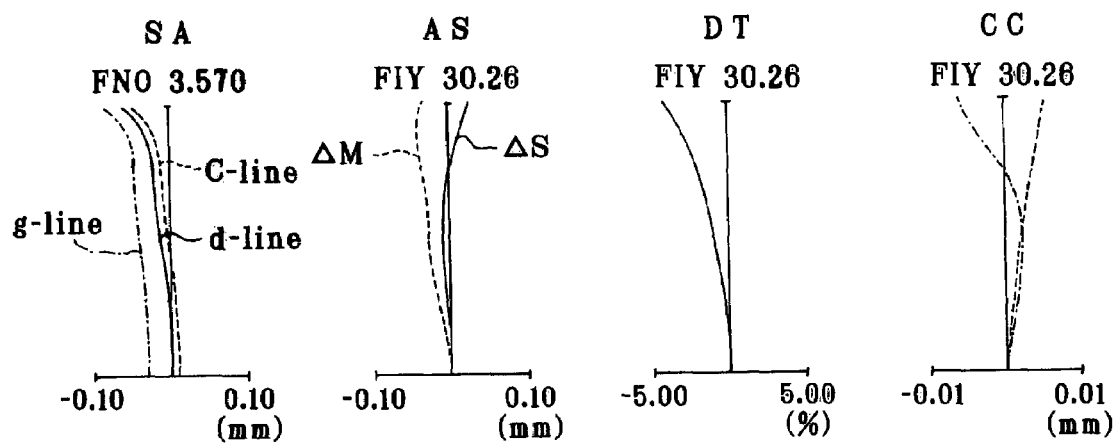
FIG. 15 is indicative, as in FIG. 10, of aberrations for Example 6.
Figure 15B:
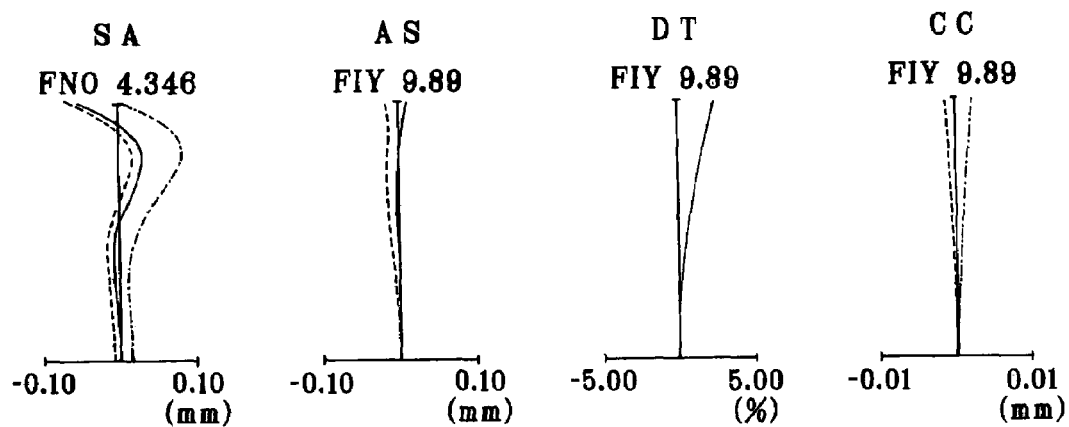
Figure 15C:
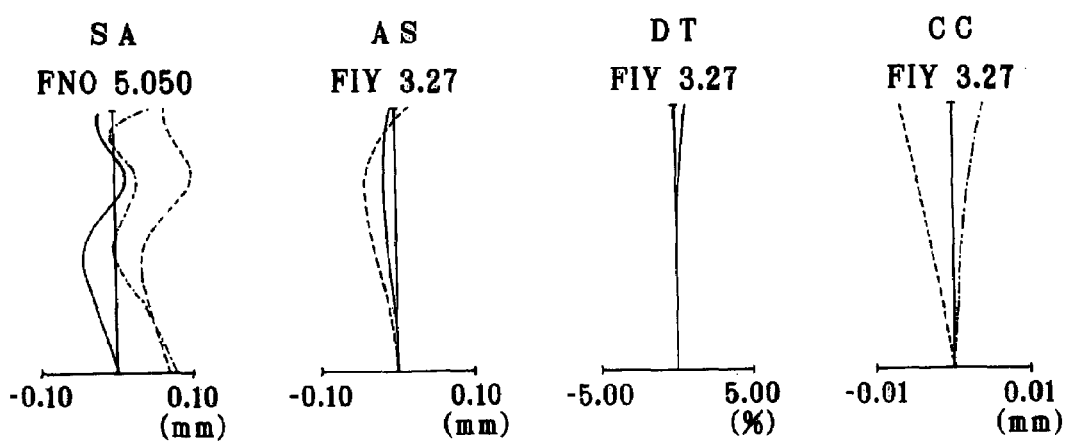
Figure 16A:
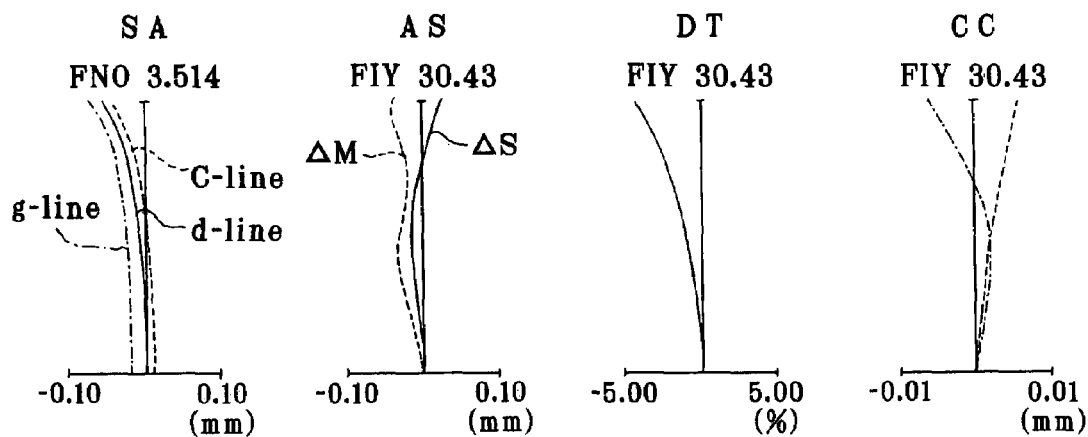
FIG. 16 is indicative, as in FIG. 10, of aberrations for Example 7.
Figure 16B:
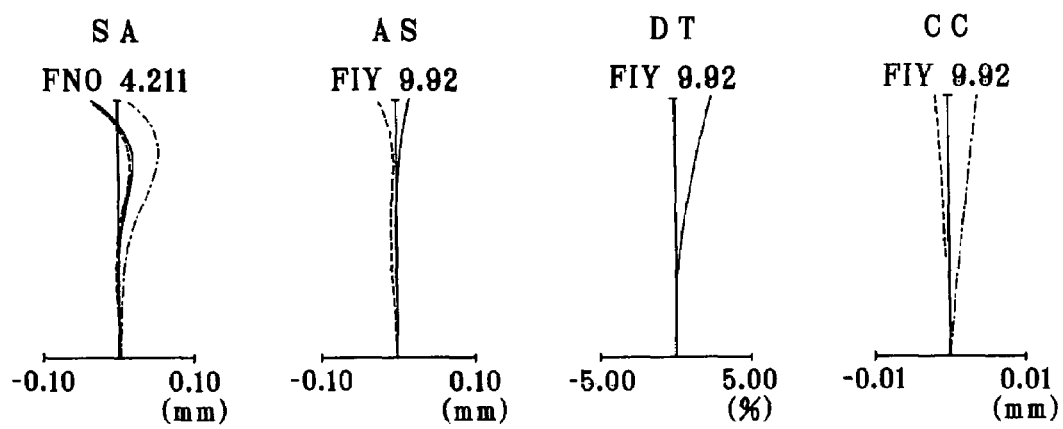
Figure 16C:
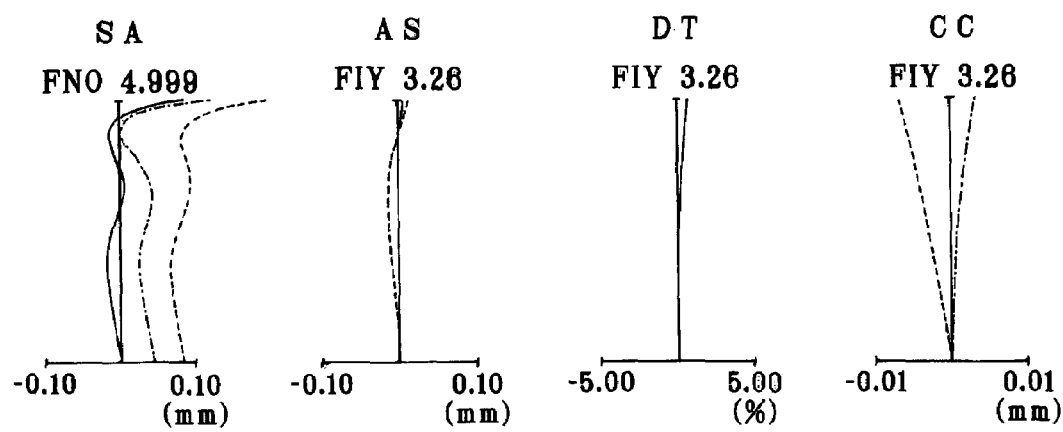
Figure 17A:
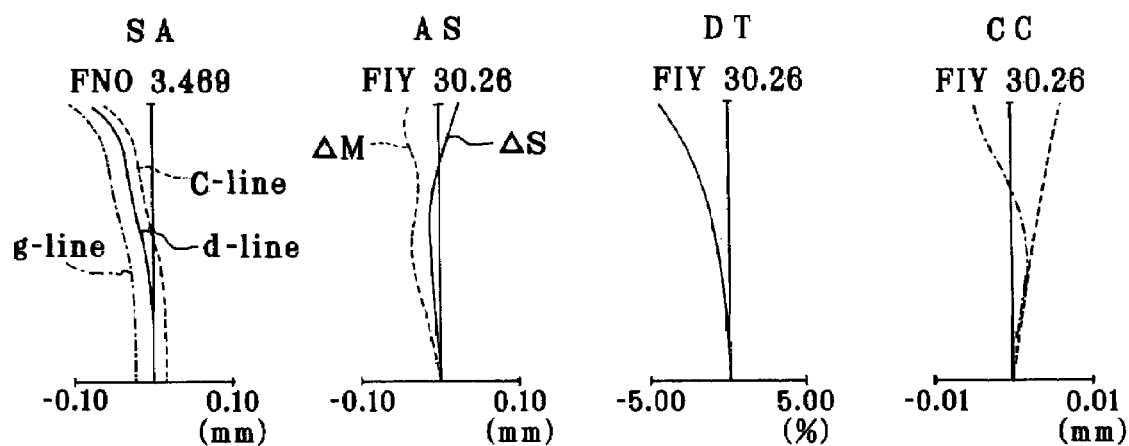
FIG. 17 is indicative, as in FIG. 10, of aberrations for Example 8.
Figure 17B:
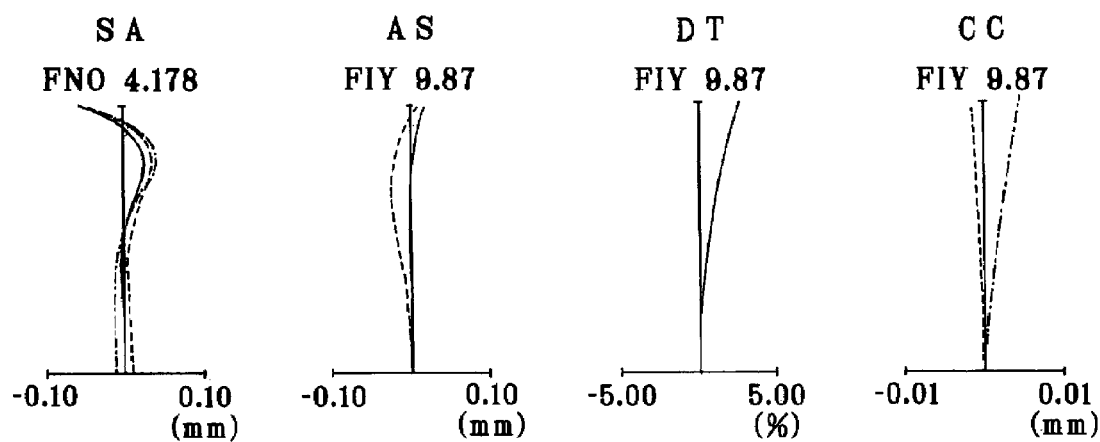
Figure 17C:
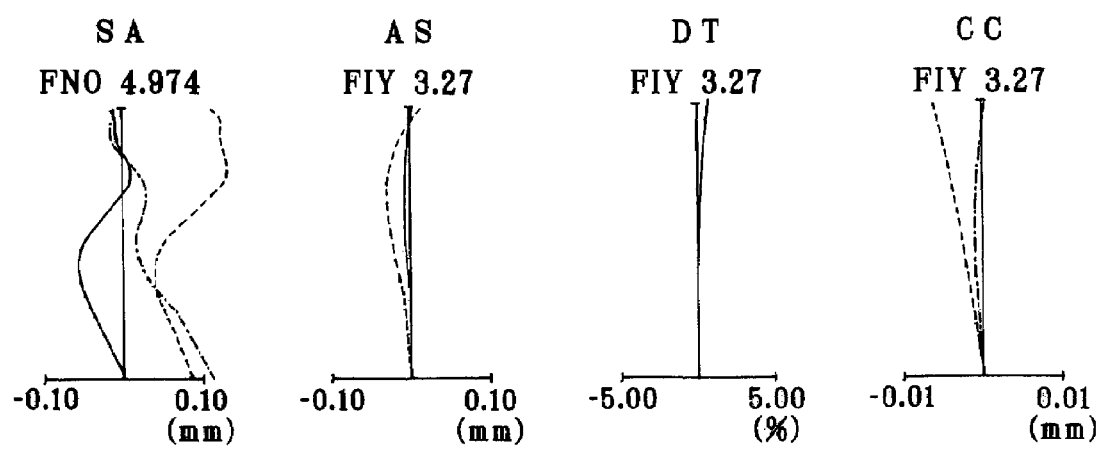
Figure 18A:
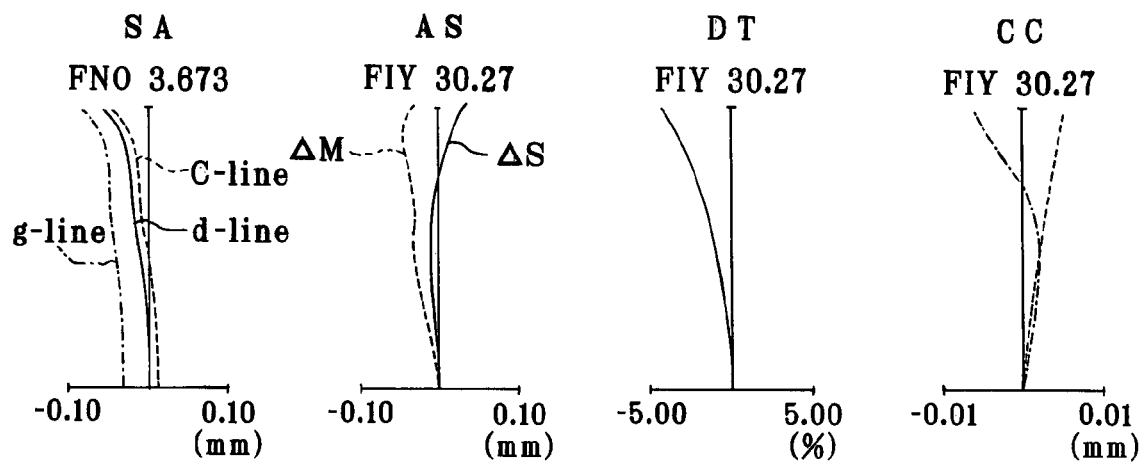
FIG. 18 is indicative, as in FIG. 10, of aberrations for Example 9.
Figure 18B:
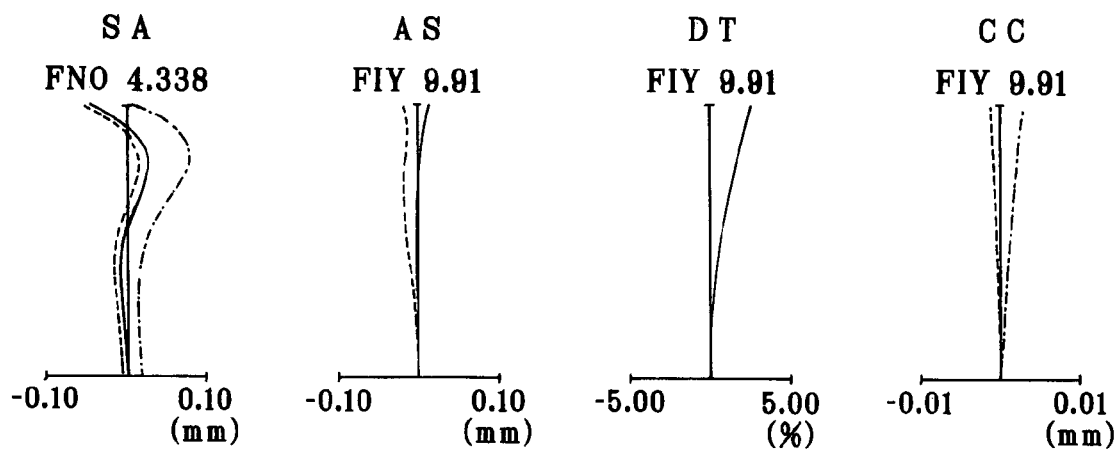
Figure 18C:
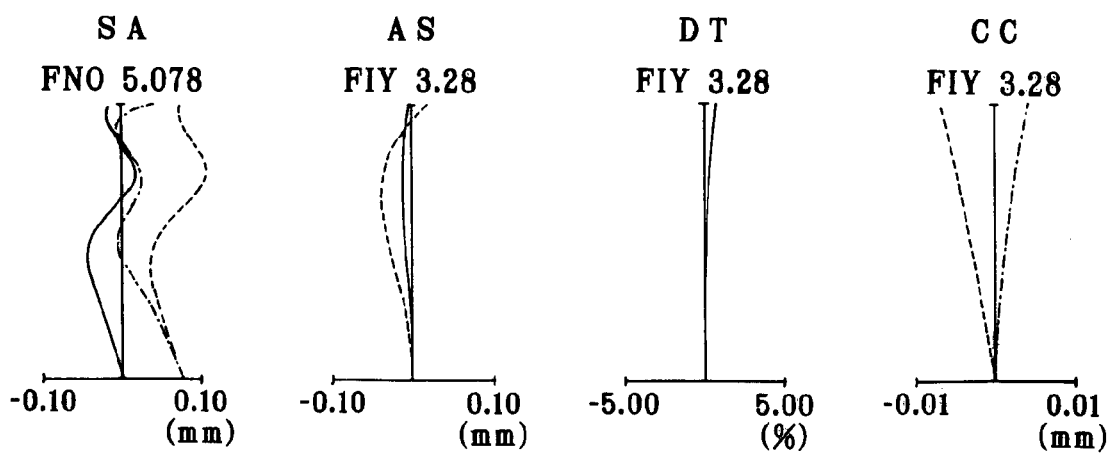

This example is directed to a bent type zoom optical system that, as shown in FIG. 9, is built up of, in order from its object side, the first lens group G1 that has positive power and remains fixed upon zooming, the second lens group G2 that has negative power and moves toward an image side from a wide-angle end to a telephoto end upon zooming such that it is positioned on the image side at the telephoto end rather than at the wide-angle end, the third lens group G3 hat has positive power and remains fixed upon zooming, the fourth lens group G4 that has positive power and moves toward the object side from the wide-angle end to the telephoto end upon zooming such that it is positioned on the object side at the telephoto end rather than at the wide-angle end, and the fifth lens group G5 that has positive power and moves somewhat toward the object side from the wide-angle end up to an intermediate setting and toward the image side from the intermediate setting to the telephoto end, wherein an optical path is bent by the prism P located in the first lens group G1. By this prism P, the optical path is bent in a camera's longitudinal or transverse direction. Focusing is implemented at the third G3, the fourth G4 or the fifth lens group G5. Note here that the fourth G4 and the fifth lens group G5 form together the lens group unit A.

Referring to how each lens group is set up in order from the object side, the first lens group G1 is made up of a double-concave negative lens, the prism P, a double-convex positive lens and a double-convex positive lens; the second lens group G2 is made up of a double-concave negative lens and a doublet consisting of a negative meniscus lens convex on its object side and a positive meniscus lens convex on its object side; the third lens group G3 is made up of a double-convex positive lens, the aperture stop S and a double-concave negative lens; the fourth lens group G4 is made up of a double-convex positive lens, a double-convex positive lens and a doublet consisting of a double-convex positive lens and a double-concave negative lens; and the fifth lens group G5 is made up of a doublet consisting of a double-concave negative lens and a double-convex positive lens.

Seven aspheric surfaces are applied: two for both surfaces of the second double-convex positive lens in the first lens group G1, two for both surfaces of the double-concave negative lens in the second lens group G2, two for both surfaces of the first double-convex positive lens in the fourth lens group G4, and one for the surface located in the doublet in the fifth lens group G5 and nearest to its image side.

Set out below are numerical data on each example. The symbols used hereinafter but not hereinbefore have the following meanings.

f: the focal length of the zoom lens,
$F_{NO}$: F-number,
2ω: full angle of view,
WE: the wide-angle end,
ST: the intermediate setting,
TE: the telephoto end,
$r_1, r_2, \ldots$: the radius of curvature of each lens surface,
$d_1, d_2, \ldots$: the space between adjoining lens surfaces,
$n_{d1}, n_{d2}, \ldots$: the d-line refractive index of each lens, and
$v_{d1}, v_{d2}, \ldots$: the Abbe number of each lens.

Here let x be indicative of an optical axis provided that the direction of travel of light is taken as positive, and y be indicative of a direction orthogonal to the optical axis. Then, aspheric shape is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4, A_6, A_8$ and $A_{10}$ are the $4^{th}, 6^{th}, 8^{th}$ and $10^{th}$ aspheric coefficients, respectively.

EXAMPLE 1

| | | | |
|---|---|---|---|
| $r_1 = -130.174$ | $d_1 = 1.20$ | $n_{d1} = 1.92286$ | $v_{d1} = 20.88$ |
| $r_2 = 43.086$ | $d_2 = 0.94$ | | |
| $r_3 = \infty$ | $d_3 = 13.80$ | $n_{d2} = 1.80100$ | $v_{d2} = 34.97$ |
| $r_4 = \infty$ | $d_4 = 0.20$ | | |
| $r_5 = 16.322$ | $d_5 = 2.56$ | $n_{d3} = 1.76802$ | $v_{d3} = 49.24$ |
| $r_6 = -47.877$ (Aspheric) | $d_6 =$ (Variable) | | |
| $r_7 = -35.713$ | $d_7 = 1.00$ | $n_{d4} = 1.80610$ | $v_{d4} = 40.92$ |
| $r_8 = 5.604$ (Aspheric) | $d_8 = 2.17$ | | |
| $r_9 = 14.804$ | $d_9 = 1.56$ | $n_{d5} = 1.92286$ | $v_{d5} = 20.88$ |
| $r_{10} = 41.407$ | $d_{10} =$ (Variable) | | |
| $r_{11} = 18.499$ | $d_{11} = 1.39$ | $n_{d6} = 1.92286$ | $v_{d6} = 20.88$ |
| $r_{12} = 29.001$ | $d_{12} = 0.80$ | | |
| $r_{13} = \infty$(Stop) | $d_{13} =$ (Variable) | | |
| $r_{14} = 8.547$ (Aspheric) | $d_{14} = 4.15$ | $n_{d7} = 1.49700$ | $v_{d7} = 81.54$ |
| $r_{15} = -13.837$ (Aspheric) | $d_{15} = 0.20$ | | |
| $r_{16} = 48.789$ | $d_{16} = 3.81$ | $n_{d8} = 1.61800$ | $v_{d8} = 63.33$ |
| $r_{17} = -7.488$ | $d_{17} = 0.65$ | $n_{d9} = 1.64769$ | $v_{d9} = 33.79$ |
| $r_{18} = 7.488$ | $d_{18} =$ (Variable) | | |
| $r_{19} = 19.943$ | $d_{19} = 2.32$ | $n_{d10} = 1.52542$ | $v_{d10} = 55.78$ |
| $r_{20} = -25.502$ (Aspheric) | $d_{20} =$ (Variable) | | |
| $r_{21} = \infty$ | $d_{21} = 0.75$ | $n_{d11} = 1.51633$ | $v_{d11} = 64.14$ |
| $r_{22} = \infty$ | $d_{22} = 0.50$ | | |
| $r_{23} = \infty$ | $d_{23} = 0.50$ | $n_{d12} = 1.51633$ | $v_{d12} = 64.14$ |
| $r_{24} = \infty$ | $d_{24} = 0.37$ | | |
| $r_{25} = \infty$(Imaging plane) | | | |

Aspherical Coefficients

6th surface

K = 0.000
$A_4 = 5.53951 \times 10^{-5}$
$A_6 = 7.45682 \times 10^{-8}$
$A_8 = -9.62928 \times 10^{-9}$
$A_{10} = 1.38032 \times 10^{-10}$ 8th surface K = 0.000
$A_4 = -8.42944 \times 10^{-4}$
$A_6 = -9.21809 \times 10^{-6}$
$A_8 = -5.45730 \times 10^{-8}$
$A_{10} = -2.27292 \times 10^{-8}$ -continued 14th surface K = 0.000
$A_4 = -2.70333 \times 10^{-4}$
$A_6 = -3.78969 \times 10^{-7}$
$A_8 = -5.13874 \times 10^{-8}$
$A_{10} = -1.72465 \times 10^{-9}$ 15th surface K = 0.000
$A_4 = 1.57395 \times 10^{-4}$
$A_6 = 3.03758 \times 10^{-7}$
$A_8 = -1.03104 \times 10^{-7}$
$A_{10} = 0$ 20th surface K = 0.000
$A_4 = 1.54489 \times 10^{-4}$
$A_6 = -3.15169 \times 10^{-6}$
$A_8 = 1.49728 \times 10^{-7}$
$A_{10} = -4.48517 \times 10^{-9}$

| Zooming Data ($\infty$) | | | |
|---|---|---|---|
| | WE | ST | TE |
| f (mm) | 6.41 | 15.44 | 38.00 |
| $F_{NO}$ | 3.51 | 3.96 | 5.02 |
| $2\omega$ (°) | 60.68 | 25.60 | 10.59 |
| $d_6$ | 0.70 | 6.33 | 9.65 |
| $d_{10}$ | 9.45 | 3.81 | 0.50 |
| $d_{13}$ | 15.13 | 8.34 | 0.50 |
| $d_{18}$ | 3.92 | 10.84 | 22.41 |
| $d_{20}$ | 6.89 | 6.69 | 3.02 |

EXAMPLE 2

| | | | |
|---|---|---|---|
| $r_1 = 252.674$ | $d_1 = 1.20$ | $n_{d1} = 1.92286$ | $\nu_{d1} = 20.88$ |
| $r_2 = 25.849$ | $d_2 = 1.55$ | | |
| $r_3 = \infty$ | $d_3 = 13.80$ | $n_{d2} = 1.80100$ | $\nu_{d2} = 34.97$ |
| $r_4 = \infty$ | $d_4 = 0.20$ | | |
| $r_5 = 18.961$ | $d_5 = 2.85$ | $n_{d3} = 1.77377$ | $\nu_{d3} = 47.17$ |
| $r_6 = -36.901$ (Aspheric) | $d_6 = $ (Variable) | | |
| $r_7 = -24.023$ | $d_7 = 1.00$ | $n_{d4} = 1.80610$ | $\nu_{d4} = 40.92$ |
| $r_8 = 6.787$ (Aspheric) | $d_8 = 1.90$ | | |
| $r_9 = 17.424$ | $d_9 = 1.45$ | $n_{d5} = 1.92286$ | $\nu_{d5} = 20.88$ |
| $r_{10} = 48.482$ | $d_{10} = $ (Variable) | | |
| $r_{11} = 21.867$ | $d_{11} = 1.43$ | $n_{d6} = 1.92286$ | $\nu_{d6} = 20.88$ |
| $r_{12} = 44.453$ | $d_{12} = 0.62$ | | |
| $r_{13} = \infty$ (Stop) | $d_{13} = $ (Variable) | | |
| $r_{14} = 8.026$ (Aspheric) | $d_{14} = 4.33$ | $n_{d7} = 1.49700$ | $\nu_{d7} = 81.54$ |
| $r_{15} = -17.674$ (Aspheric) | $d_{15} = 0.20$ | | |
| $r_{16} = 32.791$ | $d_{16} = 3.06$ | $n_{d8} = 1.61800$ | $\nu_{d8} = 63.33$ |
| $r_{17} = -10.025$ | $d_{17} = 0.70$ | $n_{d9} = 1.64769$ | $\nu_{d9} = 33.79$ |
| $r_{18} = 6.700$ | $d_{18} = $ (Variable) | | |
| $r_{19} = 19.385$ | $d_{19} = 2.24$ | $n_{d10} = 1.49700$ | $\nu_{d10} = 81.54$ |
| $r_{20} = -28.616$ (Aspheric) | $d_{20} = $ (Variable) | | |
| $r_{21} = \infty$ | $d_{21} = 0.75$ | $n_{d11} = 1.51633$ | $\nu_{d11} = 64.14$ |
| $r_{22} = \infty$ | $d_{22} = 0.50$ | | |
| $r_{23} = \infty$ | $d_{23} = 0.50$ | $n_{d12} = 1.51633$ | $\nu_{d12} = 64.14$ |
| $r_{24} = \infty$ | $d_{24} = 0.37$ | | |
| $r_{25} = \infty$ (Imaging plane) | | | |

Aspherical Coefficients

6th surface

K = 0.000
$A_4 = 4.34741 \times 10^{-5}$
$A_6 = 1.17640 \times 10^{-8}$
$A_8 = -3.40284 \times 10^{-9}$
$A_{10} = 4.01722 \times 10^{-11}$ 8th surface K = 0.000
$A_4 = -5.93540 \times 10^{-4}$
$A_6 = -1.73598 \times 10^{-6}$
$A_8 = -1.41556 \times 10^{-8}$
$A_{10} = -7.24531 \times 10^{-9}$ 14th surface K = 0.000
$A_4 = -2.03710 \times 10^{-4}$
$A_6 = -1.29966 \times 10^{-6}$
$A_8 = 1.80688 \times 10^{-8}$
$A_{10} = -1.05297 \times 10^{-9}$ 15th surface K = 0.000
$A_4 = 2.12348 \times 10^{-4}$
$A_6 = -1.24892 \times 10^{-6}$
$A_8 = 5.40750 \times 10^{-8}$
$A_{10} = -1.11623 \times 10^{-9}$ 20th surface K = 0.000
$A_4 = 5.40754 \times 10^{-5}$
$A_6 = 1.86019 \times 10^{-6}$
$A_8 = -1.47162 \times 10^{-7}$
$A_{10} = 2.77271 \times 10^{-9}$

| Zooming Data ($\infty$) | | | |
|---|---|---|---|
| | WE | ST | TE |
| f (mm) | 6.42 | 17.80 | 44.85 |
| $F_{NO}$ | 3.50 | 3.99 | 4.86 |
| $2\omega$ (°) | 60.72 | 22.29 | 9.03 |
| $d_6$ | 0.70 | 7.51 | 11.35 |
| $d_{10}$ | 11.15 | 4.33 | 0.50 |
| $d_{13}$ | 17.82 | 8.47 | 0.50 |
| $d_{18}$ | 3.99 | 13.46 | 25.94 |
| $d_{20}$ | 7.59 | 7.45 | 2.99 |

EXAMPLE 3

| | | | |
|---|---|---|---|
| $r_1 = -149.275$ | $d_1 = 1.20$ | $n_{d1} = 1.92286$ | $\nu_{d1} = 20.88$ |
| $r_2 = 27.013$ | $d_2 = 1.56$ | | |
| $r_3 = \infty$ | $d_3 = 15.40$ | $n_{d2} = 1.80100$ | $\nu_{d2} = 34.97$ |
| $r_4 = \infty$ | $d_4 = 0.20$ | | |
| $r_5 = 71.283$ | $d_5 = 1.87$ | $n_{d3} = 1.69680$ | $\nu_{d3} = 55.53$ |
| $r_6 = -106.683$ | $d_6 = 0.20$ | | |
| $r_7 = 18.326$ | $d_7 = 3.41$ | $n_{d4} = 1.69350$ | $\nu_{d4} = 53.21$ |
| $r_8 = -63.160$ (Aspheric) | $d_8 = $ (Variable) | | |
| $r_9 = -36.828$ | $d_9 = 0.90$ | $n_{d5} = 1.80610$ | $\nu_{d5} = 40.92$ |
| $r_{10} = 7.439$ (Aspheric) | $d_{10} = 1.21$ | | |
| $r_{11} = 25.261$ | $d_{11} = 1.29$ | $n_{d6} = 1.84666$ | $\nu_{d6} = 23.78$ |
| $r_{12} = 62.543$ | $d_{12} = $ (Variable) | | |
| $r_{13} = 21.357$ | $d_{13} = 2.07$ | $n_{d7} = 1.92286$ | $\nu_{d7} = 20.88$ |
| $r_{14} = -49.304$ | $d_{14} = 0.50$ | | |
| $r_{15} = \infty$ (Stop) | $d_{15} = 1.12$ | | |
| $r_{16} = -20.134$ | $d_{16} = 0.62$ | $n_{d8} = 1.80610$ | $\nu_{d8} = 40.92$ |
| $r_{17} = 37.635$ | $d_{17} = $ (Variable) | | |
| $r_{18} = 10.943$ (Aspheric) | $d_{18} = 4.02$ | $n_{d9} = 1.49700$ | $\nu_{d9} = 81.54$ |
| $r_{19} = -15.182$ (Aspheric) | $d_{19} = 0.20$ | | |
| $r_{20} = 25.759$ | $d_{20} = 3.39$ | $n_{d10} = 1.69680$ | $\nu_{d10} = 55.53$ |
| $r_{21} = -12.450$ | $d_{21} = 0.70$ | $n_{d11} = 1.80100$ | $\nu_{d11} = 34.97$ |
| $r_{22} = 17.026$ | $d_{22} = $ (Variable) | | |
| $r_{23} = 262.044$ | $d_{23} = 0.65$ | $n_{d12} = 1.80100$ | $\nu_{d12} = 34.97$ |

-continued

| | | | |
|---|---|---|---|
| $r_{24} = 7.700$ | $d_{24} = 4.33$ | $n_{d13} = 1.58913$ | $v_{d13} = 61.28$ |
| $r_{25} = -15.657$ (Aspheric) | $d_{25}$ = (Variable) | | |
| $r_{26} = \infty$ | $d_{26} = 0.75$ | $n_{d14} = 1.51633$ | $v_{d14} = 64.14$ |
| $r_{27} = \infty$ | $d_{27} = 0.50$ | | |
| $r_{28} = \infty$ | $d_{28} = 0.50$ | $n_{d15} = 1.51633$ | $v_{d15} = 64.14$ |
| $r_{29} = \infty$ | $d_{29} = 0.37$ | | |
| $r_{30} = \infty$ (Imaging plane) | | | |

Aspherical Coefficients

8th surface $K = 0.000$
$A_4 = 3.34641 \times 10^{-5}$
$A_6 = -4.99969 \times 10^{-8}$
$A_8 = -9.13795 \times 10^{-10}$
$A_{10} = 9.37222 \times 10^{-12}$ 10th surface $K = 0.000$
$A_4 = -4.46866 \times 10^{-4}$
$A_6 = -4.68857 \times 10^{-6}$
$A_8 = 2.24254 \times 10^{-7}$
$A_{10} = -7.22176 \times 10^{-9}$ 18th surface $K = 0.000$
$A_4 = -1.34378 \times 10^{-4}$
$A_6 = 2.28435 \times 10^{-6}$
$A_8 = -1.69311 \times 10^{-7}$
$A_{10} = 4.13129 \times 10^{-9}$ 19th surface $K = 0.000$
$A_4 = 1.01953 \times 10^{-4}$
$A_6 = 2.74039 \times 10^{-6}$
$A_8 = -2.06015 \times 10^{-7}$
$A_{10} = 5.14314 \times 10^{-9}$ 25th surface $K = 0.000$
$A_4 = 1.02970 \times 10^{-4}$
$A_6 = 6.54683 \times 10^{-8}$
$A_8 = 3.82816 \times 10^{-8}$
$A_{10} = -3.22546 \times 10^{-9}$ Zooming Data ($\infty$)

| | WE | ST | TE |
|---|---|---|---|
| f (mm) | 6.44 | 17.80 | 48.95 |
| $F_{NO}$ | 3.49 | 3.80 | 5.06 |
| $2\omega$ (°) | 60.45 | 22.31 | 8.24 |
| $d_8$ | 0.60 | 7.40 | 11.05 |
| $d_{12}$ | 10.95 | 4.15 | 0.50 |
| $d_{17}$ | 14.74 | 8.40 | 0.50 |
| $d_{22}$ | 3.85 | 11.11 | 25.76 |
| $d_{25}$ | 10.73 | 9.74 | 3.10 |

EXAMPLE 4

| | | | |
|---|---|---|---|
| $r_1 = -334.712$ | $d_1 = 1.25$ | $n_{d1} = 1.92286$ | $v_{d1} = 20.88$ |
| $r_2 = 25.040$ | $d_2 = 1.67$ | | |
| $r_3 = \infty$ | $d_3 = 17.00$ | $n_{d2} = 1.80100$ | $v_{d2} = 34.97$ |
| $r_4 = \infty$ | $d_4 = 0.20$ | | |
| $r_5 = 45.567$ | $d_5 = 1.93$ | $n_{d3} = 1.69680$ | $v_{d3} = 55.53$ |
| $r_6 = -159.676$ | $d_6 = 0.20$ | | |
| $r_7 = 20.345$ | $d_7 = 3.17$ | $n_{d4} = 1.69350$ | $v_{d4} = 53.21$ |
| $r_8 = -69.440$ (Aspheric) | $d_8$ = (Variable) | | |
| $r_9 = -38.592$ | $d_9 = 1.00$ | $n_{d5} = 1.80610$ | $v_{d5} = 40.92$ |
| $r_{10} = 7.322$ (Aspheric) | $d_{10} = 0.99$ | | |

-continued

| | | | |
|---|---|---|---|
| $r_{11} = 17.008$ | $d_{11} = 1.25$ | $n_{d6} = 1.92286$ | $v_{d6} = 20.88$ |
| $r_{12} = 29.148$ | $d_{12}$ = (Variable) | | |
| $r_{13} = 21.630$ | $d_{13} = 1.89$ | $n_{d7} = 1.92286$ | $v_{d7} = 20.88$ |
| $r_{14} = -70.785$ | $d_{14} = 0.50$ | | |
| $r_{15} = \infty$ (Stop) | $d_{15} = 0.89$ | | |
| $r_{16} = -22.691$ | $d_{16} = 0.69$ | $n_{d8} = 1.80610$ | $v_{d8} = 40.92$ |
| $r_{17} = 55.271$ | $d_{17}$ = (Variable) | | |
| $r_{18} = 10.316$ (Aspheric) | $d_{18} = 4.16$ | $n_{d9} = 1.49700$ | $v_{d9} = 81.54$ |
| $r_{19} = -15.372$ (Aspheric) | $d_{19} = 0.20$ | | |
| $r_{20} = 27.419$ | $d_{20} = 3.35$ | $n_{d10} = 1.69680$ | $v_{d10} = 55.53$ |
| $r_{21} = -12.324$ | $d_{21} = 0.68$ | $n_{d11} = 1.80100$ | $v_{d11} = 34.97$ |
| $r_{22} = 14.345$ | $d_{22}$ = (Variable) | | |
| $r_{23} = 60.838$ | $d_{23} = 0.63$ | $n_{d12} = 1.80100$ | $v_{d12} = 34.97$ |
| $r_{24} = 8.388$ | $d_{24} = 3.68$ | $n_{d13} = 1.58913$ | $v_{d13} = 61.28$ |
| $r_{25} = -19.868$ (Aspheric) | $d_{25}$ = (Variable) | | |
| $r_{26} = \infty$ | $d_{26} = 0.75$ | $n_{d14} = 1.51633$ | $v_{d14} = 64.14$ |
| $r_{27} = \infty$ | $d_{27} = 0.50$ | | |
| $r_{28} = \infty$ | $d_{28} = 0.50$ | $n_{d15} = 1.51633$ | $v_{d15} = 64.14$ |
| $r_{29} = \infty$ | $d_{29} = 0.31$ | | |
| $r_{30} = \infty$ (Imaging plane) | | | |

Aspherical Coefficients

8th surface $K = 0.000$
$A_4 = 2.59778 \times 10^{-5}$
$A_6 = -6.40827 \times 10^{-8}$
$A_8 = 1.37084 \times 10^{-10}$
$A_{10} = 2.21666 \times 10^{-13}$ 10th surface $K = 0.000$
$A_4 = -4.13584 \times 10^{-4}$
$A_6 = -2.54841 \times 10^{-6}$
$A_8 = -3.58568 \times 10^{-8}$
$A_{10} = -8.87672 \times 10^{-10}$ 18th surface $K = 0.000$
$A_4 = -1.40758 \times 10^{-4}$
$A_6 = 4.31176 \times 10^{-6}$
$A_8 = -2.62736 \times 10^{-7}$
$A_{10} = 6.18635 \times 10^{-9}$ 19th surface $K = 0.000$
$A_4 = 1.21974 \times 10^{-4}$
$A_6 = 5.77621 \times 10^{-6}$
$A_8 = -3.58700 \times 10^{-7}$
$A_{10} = 8.62355 \times 10^{-9}$ 25th surface $K = 0.000$
$A_4 = 1.08737 \times 10^{-4}$
$A_6 = -3.40246 \times 10^{-6}$
$A_8 = 2.93721 \times 10^{-7}$
$A_{10} = -8.94187 \times 10^{-9}$ Zooming Data ($\infty$)

| | WE | ST | TE |
|---|---|---|---|
| f (mm) | 6.45 | 17.83 | 49.02 |
| $F_{NO}$ | 3.57 | 3.90 | 5.02 |
| $2\omega$ (°) | 60.51 | 22.28 | 8.25 |
| $d_8$ | 0.60 | 7.23 | 11.11 |
| $d_{12}$ | 11.01 | 4.38 | 0.50 |
| $d_{17}$ | 16.12 | 8.76 | 0.50 |
| $d_{22}$ | 3.87 | 11.84 | 26.91 |
| $d_{25}$ | 10.45 | 9.75 | 2.99 |

EXAMPLE 5

| | | | |
|---|---|---|---|
| $r_1 = -71.504$ | $d_1 = 1.25$ | $n_{d1} = 1.92286$ | $\nu_{d1} = 20.88$ |
| $r_2 = 30.816$ | $d_2 = 1.48$ | | |
| $r_3 = \infty$ | $d_3 = 18.60$ | $n_{d2} = 1.80100$ | $\nu_{d2} = 34.97$ |
| $r_4 = \infty$ | $d_4 = 0.20$ | | |
| $r_5 = 54.499$ | $d_5 = 2.69$ | $n_{d3} = 1.69680$ | $\nu_{d3} = 55.53$ |
| $r_6 = -54.049$ | $d_6 = 0.20$ | | |
| $r_7 = 24.259$ (Aspheric) | $d_7 = 3.28$ | $n_{d4} = 1.69350$ | $\nu_{d4} = 53.21$ |
| $r_8 = -139.447$ | $d_8 =$ (Variable) | | |
| $r_9 = -463.526$ | $d_9 = 1.00$ | $n_{d5} = 1.80610$ | $\nu_{d5} = 40.92$ |
| $r_{10} = 9.037$ (Aspheric) | $d_{10} = 1.06$ | | |
| $r_{11} = 20.143$ | $d_{11} = 0.73$ | $n_{d6} = 1.80100$ | $\nu_{d6} = 34.97$ |
| $r_{12} = 9.919$ | $d_{12} = 1.77$ | $n_{d7} = 1.92286$ | $\nu_{d7} = 20.88$ |
| $r_{13} = 17.476$ | $d_{13} =$ (Variable) | | |
| $r_{14} = 18.014$ | $d_{14} = 1.89$ | $n_{d8} = 1.92286$ | $\nu_{d8} = 20.88$ |
| $r_{15} = -501.290$ | $d_{15} = 0.35$ | | |
| $r_{16} = \infty$ (Stop) | $d_{16} = 1.20$ | | |
| $r_{17} = -20.502$ | $d_{17} = 0.70$ | $n_{d9} = 1.83400$ | $\nu_{d9} = 37.16$ |
| $r_{18} = 49.343$ | $d_{18} =$ (Variable) | | |
| $r_{19} = 12.878$ (Aspheric) | $d_{19} = 3.51$ | $n_{d10} = 1.49700$ | $\nu_{d10} = 81.54$ |
| $r_{20} = -19.845$ (Aspheric) | $d_{20} = 0.20$ | | |
| $r_{21} = 17.564$ | $d_{21} = 2.49$ | $n_{d11} = 1.49700$ | $\nu_{d11} = 81.54$ |
| $r_{22} = -52.664$ | $d_{22} = 0.30$ | | |
| $r_{23} = 111.813$ | $d_{23} = 2.79$ | $n_{d12} = 1.69680$ | $\nu_{d12} = 55.53$ |
| $r_{24} = -10.822$ | $d_{24} = 0.69$ | $n_{d13} = 1.80100$ | $\nu_{d13} = 34.97$ |
| $r_{25} = 13.249$ | $d_{25} =$ (Variable) | | |
| $r_{26} = -48.171$ | $d_{26} = 0.64$ | $n_{d14} = 1.83400$ | $\nu_{d14} = 37.16$ |
| $r_{27} = 16.798$ | $d_{27} = 2.80$ | $n_{d15} = 1.59201$ | $\nu_{d15} = 67.02$ |
| $r_{28} = -12.997$ (Aspheric) | $d_{28} =$ (Variable) | | |
| $r_{29} = \infty$ | $d_{29} = 0.75$ | $n_{d16} = 1.51633$ | $\nu_{d16} = 64.14$ |
| $r_{30} = \infty$ | $d_{30} = 0.50$ | | |
| $r_{31} = \infty$ | $d_{31} = 0.50$ | $n_{d17} = 1.51633$ | $\nu_{d17} = 64.14$ |
| $r_{32} = \infty$ | $d_{32} = 0.34$ | | |
| $r_{33} = \infty$ (Imaging plane) | | | |

Aspherical Coefficients

7th surface $K = 0.000$
$A_4 = -9.97436 \times 10^{-6}$
$A_6 = -3.26566 \times 10^{-8}$
$A_8 = 3.59390 \times 10^{-10}$
$A_{10} = -1.94315 \times 10^{-12}$ 10th surface $K = 0.000$
$A_4 = -1.61569 \times 10^{-4}$
$A_6 = -1.78122 \times 10^{-6}$
$A_8 = 5.42952 \times 10^{-8}$
$A_{10} = -1.38762 \times 10^{-9}$ 19th surface $K = 0.000$
$A_4 = -9.00996 \times 10^{-5}$
$A_6 = 1.78316 \times 10^{-6}$
$A_8 = -8.86379 \times 10^{-8}$
$A_{10} = 2.07955 \times 10^{-9}$ 20th surface $K = 0.000$
$A_4 = 6.38849 \times 10^{-5}$
$A_6 = 1.78689 \times 10^{-6}$
$A_8 = -1.01750 \times 10^{-7}$
$A_{10} = 2.43499 \times 10^{-9}$ 28th surface $K = 0.000$
$A_4 = 1.75335 \times 10^{-4}$
$A_6 = 1.15134 \times 10^{-6}$
$A_8 = 1.95726 \times 10^{-8}$
$A_{10} = -2.05640 \times 10^{-9}$

Zooming Data ($\infty$)

| | WE | ST | TE |
|---|---|---|---|
| f (mm) | 6.45 | 19.11 | 57.45 |
| $F_{NO}$ | 3.51 | 4.15 | 5.04 |
| $2\omega$ (°) | 60.55 | 20.81 | 7.06 |
| $d_8$ | 0.60 | 8.12 | 13.17 |
| $d_{13}$ | 13.07 | 5.55 | 0.50 |
| $d_{18}$ | 16.50 | 8.46 | 0.50 |
| $d_{25}$ | 4.32 | 12.10 | 27.56 |
| $d_{28}$ | 10.25 | 10.46 | 2.99 |

EXAMPLE 6

| | | | |
|---|---|---|---|
| $r_1 = -65.341$ | $d_1 = 1.25$ | $n_{d1} = 1.92286$ | $\nu_{d1} = 20.88$ |
| $r_2 = 30.656$ | $d_2 = 1.58$ | | |
| $r_3 = \infty$ | $d_3 = 20.00$ | $n_{d2} = 1.88300$ | $\nu_{d2} = 40.76$ |
| $r_4 = \infty$ | $d_4 = 0.20$ | | |
| $r_5 = 114.433$ | $d_5 = 3.17$ | $n_{d3} = 1.69680$ | $\nu_{d3} = 55.53$ |
| $r_6 = -38.490$ | $d_6 = 0.20$ | | |
| $r_7 = 23.076$ (Aspheric) | $d_7 = 3.92$ | $n_{d4} = 1.69350$ | $\nu_{d4} = 53.21$ |
| $r_8 = -295.720$ (Aspheric) | $d_8 =$ (Variable) | | |
| $r_9 = -62.810$ (Aspheric) | $d_9 = 1.00$ | $n_{d5} = 1.80610$ | $\nu_{d5} = 40.92$ |
| $r_{10} = 10.054$ (Aspheric) | $d_{10} = 1.37$ | | |
| $r_{11} = 23.420$ | $d_{11} = 0.81$ | $n_{d6} = 1.83400$ | $\nu_{d6} = 37.16$ |
| $r_{12} = 10.758$ | $d_{12} = 2.02$ | $n_{d7} = 1.92286$ | $\nu_{d7} = 20.88$ |
| $r_{13} = 21.953$ | $d_{13} =$ (Variable) | | |
| $r_{14} = 20.606$ | $d_{14} = 1.96$ | $n_{d8} = 1.92286$ | $\nu_{d8} = 20.88$ |
| $r_{15} = -500.211$ | $d_{15} = 0.50$ | | |
| $r_{16} = \infty$ (Stop) | $d_{16} = 2.14$ | | |
| $r_{17} = -17.992$ | $d_{17} = 0.85$ | $n_{d9} = 1.83400$ | $\nu_{d9} = 37.16$ |
| $r_{18} = 128.562$ | $d_{18} =$ (Variable) | | |
| $r_{19} = 11.483$ (Aspheric) | $d_{19} = 3.92$ | $n_{d10} = 1.49700$ | $\nu_{d10} = 81.54$ |
| $r_{20} = -15.733$ (Aspheric) | $d_{20} = 0.20$ | | |
| $r_{21} = 30.250$ | $d_{21} = 2.20$ | $n_{d11} = 1.49700$ | $\nu_{d11} = 81.54$ |
| $r_{22} = -39.295$ | $d_{22} = 0.20$ | | |
| $r_{23} = 218.999$ | $d_{23} = 2.91$ | $n_{d12} = 1.69680$ | $\nu_{d12} = 55.53$ |
| $r_{24} = -10.277$ | $d_{24} = 0.70$ | $n_{d13} = 1.80100$ | $\nu_{d13} = 34.97$ |
| $r_{25} = 15.308$ | $d_{25} =$ (Variable) | | |
| $r_{26} = -13.028$ | $d_{26} = 0.65$ | $n_{d14} = 1.83400$ | $\nu_{d14} = 37.16$ |
| $r_{27} = 39.859$ | $d_{27} = 4.02$ | $n_{d15} = 1.58313$ | $\nu_{d15} = 59.46$ |
| $r_{28} = -8.547$ (Aspheric) | $d_{28} =$ (Variable) | | |
| $r_{29} = \infty$ | $d_{29} = 0.75$ | $n_{d16} = 1.51633$ | $\nu_{d16} = 64.14$ |
| $r_{30} = \infty$ | $d_{30} = 0.50$ | | |
| $r_{31} = \infty$ | $d_{31} = 0.50$ | $n_{d17} = 1.51633$ | $\nu_{d17} = 64.14$ |
| $r_{32} = \infty$ | $d_{32} = 0.37$ | | |
| $r_{33} = \infty$ (Imaging plane) | | | |

Aspherical Coefficients

7th surface $K = 0.000$
$A_4 = -4.38966 \times 10^{-6}$
$A_6 = -1.91366 \times 10^{-7}$
$A_8 = 4.81848 \times 10^{-10}$
$A_{10} = -9.54519 \times 10^{-13}$ 8th surface $K = 0.000$
$A_4 = 2.29347 \times 10^{-6}$
$A_6 = -2.49275 \times 10^{-7}$
$A_8 = 1.26189 \times 10^{-9}$
$A_{10} = -2.67086 \times 10^{-12}$ -continued 9th surface K = 0.000
$A_4 = 3.46412 \times 10^{-4}$
$A_6 = -1.06969 \times 10^{-5}$
$A_8 = 1.68348 \times 10^{-7}$
$A_{10} = -9.59194 \times 10^{-10}$ 10th surface K = 0.000
$A_4 = 2.31436 \times 10^{-4}$
$A_6 = -1.10427 \times 10^{-5}$
$A_8 = 1.34542 \times 10^{-7}$
$A_{10} = -5.20044 \times 10^{-10}$ 19th surface K = −0.030
$A_4 = -1.22877 \times 10^{-4}$
$A_6 = 2.60859 \times 10^{-6}$
$A_8 = -1.37347 \times 10^{-7}$
$A_{10} = 3.38239 \times 10^{-9}$ 20th surface K = 0.000
$A_4 = 1.14647 \times 10^{-4}$
$A_6 = 3.26236 \times 10^{-6}$
$A_8 = -1.82366 \times 10^{-7}$
$A_{10} = 4.37908 \times 10^{-9}$ 28th surface K = 0.000
$A_4 = 2.41744 \times 10^{-4}$
$A_6 = 5.42820 \times 10^{-7}$
$A_8 = 6.79850 \times 10^{-8}$
$A_{10} = -1.94165 \times 10^{-9}$

| Zooming Data (∞) | | | |
|---|---|---|---|
| | WE | ST | TE |
| f (mm) | 6.44 | 20.14 | 62.54 |
| $F_{NO}$ | 3.57 | 4.35 | 5.05 |
| 2ω (°) | 60.53 | 19.77 | 6.54 |
| $d_8$ | 0.70 | 8.73 | 14.66 |
| $d_{13}$ | 14.46 | 6.42 | 0.50 |
| $d_{18}$ | 15.68 | 6.90 | 0.50 |
| $d_{25}$ | 4.91 | 12.91 | 28.34 |
| $d_{28}$ | 11.30 | 12.01 | 3.05 |

EXAMPLE 7

| | | | |
|---|---|---|---|
| $r_1 = -82.069$ | $d_1 = 1.25$ | $n_{d1} = 1.92286$ | $v_{d1} = 20.88$ |
| $r_2 = 28.798$ | $d_2 = 1.67$ | | |
| $r_3 = \infty$ | $d_3 = 20.00$ | $n_{d2} = 2.00330$ | $v_{d2} = 28.27$ |
| $r_4 = \infty$ | $d_4 = 0.20$ | | |
| $r_5 = 142.780$ | $d_5 = 2.99$ | $n_{d3} = 1.69680$ | $v_{d3} = 55.53$ |
| $r_6 = -38.246$ | $d_6 = 0.20$ | | |
| $r_7 = 20.625$ (Aspheric) | $d_7 = 3.98$ | $n_{d4} = 1.69350$ | $v_{d4} = 53.21$ |
| $r_8 = -330.679$ | $d_8 = $ (Variable) | | |
| $r_9 = -84.749$ | $d_9 = 1.00$ | $n_{d5} = 1.80610$ | $v_{d5} = 40.92$ |
| $r_{10} = 8.103$ (Aspheric) | $d_{10} = 1.29$ | | |
| $r_{11} = 21.123$ | $d_{11} = 0.75$ | $n_{d6} = 1.88300$ | $v_{d6} = 40.76$ |
| $r_{12} = 10.413$ | $d_{12} = 2.06$ | $n_{d7} = 1.92286$ | $v_{d7} = 20.88$ |
| $r_{13} = 25.612$ | $d_{13} = $ (Variable) | | |
| $r_{14} = 25.148$ | $d_{14} = 1.73$ | $n_{d8} = 1.92286$ | $v_{d8} = 20.88$ |
| $r_{15} = -277.094$ | $d_{15} = 0.51$ | | |
| $r_{16} = \infty$(Stop) | $d_{16} = 2.39$ | | |
| $r_{17} = -17.097$ | $d_{17} = 0.80$ | $n_{d9} = 1.83400$ | $v_{d9} = 37.16$ |
| $r_{18} = -350.515$ | $d_{18} = $ (Variable) | | |
| $r_{19} = 12.300$ (Aspheric) | $d_{19} = 3.98$ | $n_{d10} = 1.49700$ | $v_{d10} = 81.54$ |
| $r_{20} = -19.049$ (Aspheric) | $d_{20} = 0.20$ | | |
| $r_{21} = 30.391$ | $d_{21} = 2.43$ | $n_{d11} = 1.49700$ | $v_{d11} = 81.54$ |
| $r_{22} = -29.542$ | $d_{22} = 0.20$ | | |
| $r_{23} = 53.684$ | $d_{23} = 3.14$ | $n_{d12} = 1.69680$ | $v_{d12} = 55.53$ |
| $r_{24} = -10.680$ | $d_{24} = 0.70$ | $n_{d13} = 1.83400$ | $v_{d13} = 37.16$ |
| $r_{25} = 15.940$ | $d_{25} = $ (Variable) | | |
| $r_{26} = -15.689$ | $d_{26} = 0.65$ | $n_{d14} = 1.83400$ | $v_{d14} = 37.16$ |
| $r_{27} = 19.707$ | $d_{27} = 5.06$ | $n_{d15} = 1.58313$ | $v_{d15} = 59.46$ |
| $r_{28} = -9.604$ (Aspheric) | $d_{28} = $ (Variable) | | |
| $r_{29} = \infty$ | $d_{29} = 0.75$ | $n_{d16} = 1.51633$ | $v_{d16} = 64.14$ |
| $r_{30} = \infty$ | $d_{30} = 0.50$ | | |
| $r_{31} = \infty$ | $d_{31} = 0.50$ | $n_{d17} = 1.51633$ | $v_{d17} = 64.14$ |
| $r_{32} = \infty$ | $d_{32} = 0.37$ | | |
| $r_{33} = \infty$(Imaging plane) | | | |

Aspherical Coefficients

7th surface

K = 0.000
$A_4 = -8.22508 \times 10^{-6}$
$A_6 = -1.37269 \times 10^{-8}$
$A_8 = 9.63885 \times 10^{-12}$
$A_{10} = -2.31603 \times 10^{-13}$ 10th surface K = 0.000
$A_4 = -2.66550 \times 10^{-4}$
$A_6 = -1.83735 \times 10^{-6}$
$A_8 = -6.13298 \times 10^{-9}$
$A_{10} = -4.95749 \times 10^{-10}$ 19th surface K = 0.003
$A_4 = -1.02140 \times 10^{-4}$
$A_6 = 1.62150 \times 10^{-6}$
$A_8 = -6.60157 \times 10^{-8}$
$A_{10} = 1.35535 \times 10^{-9}$ 20th surface K = 0.000
$A_4 = 9.05331 \times 10^{-5}$
$A_6 = 1.77154 \times 10^{-6}$
$A_8 = -7.96448 \times 10^{-8}$
$A_{10} = 1.64530 \times 10^{-9}$ 28th surface K = 0.000
$A_4 = 1.93468 \times 10^{-4}$
$A_6 = 1.24115 \times 10^{-6}$
$A_8 = -2.20183 \times 10^{-8}$
$A_{10} = 2.20113 \times 10^{-10}$

| Zooming Data (∞) | | | |
|---|---|---|---|
| | WE | ST | TE |
| f (mm) | 6.40 | 20.08 | 62.59 |
| $F_{NO}$ | 3.51 | 4.21 | 5.00 |
| 2ω (°) | 60.85 | 19.83 | 6.53 |
| $d_8$ | 0.70 | 8.32 | 13.58 |
| $d_{13}$ | 13.38 | 5.75 | 0.50 |
| $d_{18}$ | 15.45 | 7.06 | 0.50 |
| $d_{25}$ | 4.71 | 11.81 | 27.90 |
| $d_{28}$ | 11.30 | 12.53 | 3.06 |

EXAMPLE 8

| | | | |
|---|---|---|---|
| $r_1 = -72.969$ | $d_1 = 1.27$ | $n_{d1} = 1.92286$ | $v_{d1} = 20.88$ |
| $r_2 = 29.773$ | $d_2 = 1.66$ | | |
| $r_3 = \infty$ | $d_3 = 20.00$ | $n_{d2} = 2.00069$ | $v_{d2} = 25.46$ |
| $r_4 = \infty$ | $d_4 = 0.20$ | | |
| $r_5 = 118.788$ | $d_5 = 3.03$ | $n_{d3} = 1.69680$ | $v_{d3} = 55.53$ |

-continued

| | | | |
|---|---|---|---|
| $r_6 = -41.882$ | $d_6 = 0.20$ | | |
| $r_7 = 20.258$ (Aspheric) | $d_7 = 4.33$ | $n_{d4} = 1.69350$ | $\nu_{d4} = 53.21$ |
| $r_8 = -228.209$ (Aspheric) | $d_8 =$ (Variable) | | |
| $r_9 = -167.187$ | $d_9 = 1.00$ | $n_{d5} = 1.80610$ | $\nu_{d5} = 40.92$ |
| $r_{10} = 7.942$ (Aspheric) | $d_{10} = 1.60$ | | |
| $r_{11} = 26.930$ | $d_{11} = 0.75$ | $n_{d6} = 1.83400$ | $\nu_{d6} = 37.16$ |
| $r_{12} = 10.513$ | $d_{12} = 2.29$ | $n_{d7} = 1.92286$ | $\nu_{d7} = 20.88$ |
| $r_{13} = 28.599$ | $d_{13} =$ (Variable) | | |
| $r_{14} = 25.330$ | $d_{14} = 1.80$ | $n_{d8} = 1.92286$ | $\nu_{d8} = 20.88$ |
| $r_{15} = -270.033$ | $d_{15} = 0.50$ | | |
| $r_{16} = \infty$(Stop) | $d_{16} = 2.41$ | | |
| $r_{17} = -18.853$ | $d_{17} = 0.76$ | $n_{d9} = 1.83400$ | $\nu_{d9} = 37.16$ |
| $r_{18} = 219.519$ | $d_{18} =$ (Variable) | | |
| $r_{19} = 11.500$ (Aspheric) | $d_{19} = 4.09$ | $n_{d10} = 1.49700$ | $\nu_{d10} = 81.54$ |
| $r_{20} = -16.310$ (Aspheric) | $d_{20} = 0.20$ | | |
| $r_{21} = 32.783$ | $d_{21} = 2.15$ | $n_{d11} = 1.48749$ | $\nu_{d11} = 70.23$ |
| $r_{22} = -45.231$ | $d_{22} = 0.20$ | | |
| $r_{23} = 68.449$ | $d_{23} = 3.20$ | $n_{d12} = 1.69680$ | $\nu_{d12} = 55.53$ |
| $r_{24} = -10.578$ | $d_{24} = 0.68$ | $n_{d13} = 1.83400$ | $\nu_{d13} = 37.16$ |
| $r_{25} = 17.152$ | $d_{25} =$ (Variable) | | |
| $r_{26} = -13.105$ | $d_{26} = 0.63$ | $n_{d14} = 1.83400$ | $\nu_{d14} = 37.16$ |
| $r_{27} = 19.391$ | $d_{27} = 4.02$ | $n_{d15} = 1.58313$ | $\nu_{d15} = 59.46$ |
| $r_{28} = -8.344$ (Aspheric) | $d_{28} =$ (Variable) | | |
| $r_{29} = \infty$ | $d_{29} = 0.75$ | $n_{d16} = 1.51633$ | $\nu_{d16} = 64.14$ |
| $r_{30} = \infty$ | $d_{30} = 0.50$ | | |
| $r_{31} = \infty$ | $d_{31} = 0.50$ | $n_{d17} = 1.51633$ | $\nu_{d17} = 64.14$ |
| $r_{32} = \infty$ | $d_{32} = 0.36$ | | |
| $r_{33} = \infty$(Imaging plane) | | | |

Aspherical Coefficients

7th surface $K = 0.000$
$A_4 = -7.17081 \times 10^{-6}$
$A_6 = -1.49746 \times 10^{-7}$
$A_8 = 1.35315 \times 10^{-11}$
$A_{10} = -6.79509 \times 10^{-13}$ 8th surface $K = 0.000$
$A_4 = 4.43943 \times 10^{-6}$
$A_6 = -2.29259 \times 10^{-7}$
$A_8 = 9.40226 \times 10^{-10}$
$A_{10} = -2.12773 \times 10^{-12}$ 10th surface $K = 0.000$
$A_4 = -2.62256 \times 10^{-4}$
$A_6 = -1.74494 \times 10^{-6}$
$A_8 = -2.17998 \times 10^{-9}$
$A_{10} = -1.08739 \times 10^{-9}$ 19th surface $K = 0.000$
$A_4 = -1.33519 \times 10^{-4}$
$A_6 = 3.00014 \times 10^{-6}$
$A_8 = -1.44178 \times 10^{-7}$
$A_{10} = 2.64796 \times 10^{-9}$ 20th surface $K = 0.000$
$A_4 = 8.41243 \times 10^{-5}$
$A_6 = 3.52323 \times 10^{-6}$
$A_8 = -1.74137 \times 10^{-7}$
$A_{10} = 3.23663 \times 10^{-9}$ 28th surface $K = 0.000$
$A_4 = 2.44471 \times 10^{-4}$
$A_6 = -9.76638 \times 10^{-8}$
$A_8 = 9.98125 \times 10^{-8}$
$A_{10} = -2.25926 \times 10^{-9}$ -continued Zooming Data ($\infty$)

| | WE | ST | TE |
|---|---|---|---|
| f (mm) | 6.45 | 20.16 | 62.52 |
| $F_{NO}$ | 3.47 | 4.18 | 4.97 |
| $2\omega$ (°) | 60.53 | 19.75 | 6.54 |
| $d_8$ | 0.70 | 8.09 | 13.04 |
| $d_{13}$ | 12.84 | 5.45 | 0.50 |
| $d_{18}$ | 15.57 | 7.34 | 0.50 |
| $d_{25}$ | 4.88 | 12.22 | 28.73 |
| $d_{28}$ | 11.85 | 12.68 | 3.07 |

EXAMPLE 9

| | | | |
|---|---|---|---|
| $r_1 = -64.670$ | $d_1 = 1.25$ | $n_{d1} = 1.92286$ | $\nu_{d1} = 20.88$ |
| $r_2 = 30.494$ | $d_2 = 1.56$ | | |
| $r_3 = \infty$ | $d_3 = 20.00$ | $n_{d2} = 1.83400$ | $\nu_{d2} = 37.16$ |
| $r_4 = \infty$ | $d_4 = 0.20$ | | |
| $r_5 = 114.464$ | $d_5 = 3.17$ | $n_{d3} = 1.69680$ | $\nu_{d3} = 55.53$ |
| $r_6 = -38.386$ | $d_6 = 0.20$ | | |
| $r_7 = 23.128$ (Aspheric) | $d_7 = 3.92$ | $n_{d4} = 1.69350$ | $\nu_{d4} = 53.21$ |
| $r_8 = -322.036$ (Aspheric) | $d_8 =$ (Variable) | | |
| $r_9 = -67.975$ (Aspheric) | $d_9 = 1.00$ | $n_{d5} = 1.80610$ | $\nu_{d5} = 40.92$ |
| $r_{10} = 10.089$ (Aspheric) | $d_{10} = 1.37$ | | |
| $r_{11} = 23.016$ | $d_{11} = 0.81$ | $n_{d6} = 1.83400$ | $\nu_{d6} = 37.16$ |
| $r_{12} = 10.668$ | $d_{12} = 2.03$ | $n_{d7} = 1.92286$ | $\nu_{d7} = 20.88$ |
| $r_{13} = 21.335$ | $d_{13} =$ (Variable) | | |
| $r_{14} = 20.258$ | $d_{14} = 1.98$ | $n_{d8} = 1.92286$ | $\nu_{d8} = 20.88$ |
| $r_{15} = -740.255$ | $d_{15} = 0.50$ | | |
| $r_{16} = \infty$(Stop) | $d_{16} = 2.11$ | | |
| $r_{17} = -17.995$ | $d_{17} = 0.85$ | $n_{d9} = 1.83400$ | $\nu_{d9} = 37.16$ |
| $r_{18} = 117.465$ | $d_{18} =$ (Variable) | | |
| $r_{19} = 11.657$ (Aspheric) | $d_{19} = 3.90$ | $n_{d10} = 1.49700$ | $\nu_{d10} = 81.54$ |
| $r_{20} = -15.841$ (Aspheric) | $d_{20} = 0.20$ | | |
| $r_{21} = 27.564$ | $d_{21} = 2.23$ | $n_{d11} = 1.49700$ | $\nu_{d11} = 81.54$ |
| $r_{22} = -40.777$ | $d_{22} = 0.20$ | | |
| $r_{23} = 180.998$ | $d_{23} = 2.89$ | $n_{d12} = 1.69680$ | $\nu_{d12} = 55.53$ |
| $r_{24} = -10.493$ | $d_{24} = 0.70$ | $n_{d13} = 1.80100$ | $\nu_{d13} = 34.97$ |
| $r_{25} = 14.866$ | $d_{25} =$ (Variable) | | |
| $r_{26} = -12.694$ | $d_{26} = 0.65$ | $n_{d14} = 1.83400$ | $\nu_{d14} = 37.16$ |
| $r_{27} = 41.493$ | $d_{27} = 4.01$ | $n_{d15} = 1.58313$ | $\nu_{d15} = 59.46$ |
| $r_{28} = -8.418$ (Aspheric) | $d_{28} =$ (Variable) | | |
| $r_{29} = \infty$ | $d_{29} = 0.75$ | $n_{d16} = 1.51633$ | $\nu_{d16} = 64.14$ |
| $r_{30} = \infty$ | $d_{30} = 0.50$ | | |
| $r_{31} = \infty$ | $d_{31} = 0.50$ | $n_{d17} = 1.51633$ | $\nu_{d17} = 64.14$ |
| $r_{32} = \infty$ | $d_{32} = 0.37$ | | |
| $r_{33} = \infty$(Imaging plane) | | | |

Aspherical Coefficients

7th surface $K = 0.000$
$A_4 = -4.31402 \times 10^{-6}$
$A_6 = -1.83743 \times 10^{-7}$
$A_8 = 4.94881 \times 10^{-10}$
$A_{10} = -9.40380 \times 10^{-13}$ 8th surface $K = 0.000$
$A_4 = 2.32835 \times 10^{-6}$
$A_6 = -2.37973 \times 10^{-7}$
$A_8 = 1.22776 \times 10^{-9}$
$A_{10} = -2.56910 \times 10^{-12}$ -continued 9th surface K = 0.000
$A_4 = 3.42561 \times 10^{-4}$
$A_6 = -1.05609 \times 10^{-5}$
$A_8 = 1.65002 \times 10^{-7}$
$A_{10} = -9.18239 \times 10^{-10}$ 10th surface K = 0.000
$A_4 = 2.32337 \times 10^{-4}$
$A_6 = -1.09099 \times 10^{-5}$
$A_8 = 1.29889 \times 10^{-7}$
$A_{10} = -3.99747 \times 10^{-10}$ 19th surface K = −0.032
$A_4 = -1.26136 \times 10^{-4}$
$A_6 = 2.69606 \times 10^{-6}$
$A_8 = -1.39350 \times 10^{-7}$
$A_{10} = 3.13608 \times 10^{-9}$ 20th surface K = 0.000
$A_4 = 1.03010 \times 10^{-4}$
$A_6 = 3.29169 \times 10^{-6}$
$A_8 = -1.78718 \times 10^{-7}$
$A_{10} = 3.94998 \times 10^{-9}$ 28th surface K = 0.000
$A_4 = 2.46999 \times 10^{-4}$
$A_6 = 8.12665 \times 10^{-7}$
$A_8 = 5.14242 \times 10^{-8}$
$A_{10} = -1.38334 \times 10^{-9}$ Zooming Data (∞)

|  | WE | ST | TE |
|---|---|---|---|
| f (mm) | 6.44 | 20.09 | 62.36 |
| $F_{NO}$ | 3.57 | 4.34 | 5.08 |
| 2ω (°) | 60.54 | 19.81 | 6.56 |
| $d_8$ | 0.70 | 8.77 | 14.64 |
| $d_{13}$ | 14.44 | 6.37 | 0.50 |
| $d_{18}$ | 15.67 | 6.98 | 0.50 |
| $d_{25}$ | 4.96 | 12.90 | 28.39 |
| $d_{28}$ | 11.30 | 11.99 | 3.04 |

FIGS. 10-18 are aberration diagrams for Examples 1-9 upon focusing on an object point at infinity, respectively. In these aberration diagrams, (a), (b) and (c) are spherical aberrations (SA), astigmatisms (AS), distortions (DT) and chromatic aberrations of magnification (CC) at the wide-angle end, in the intermediate setting, and the telephoto end, respectively, with "FIY" standing for a maximum image height.

Tabulated below are the values of conditions (1), (1)', (2), (2)', and (3)-(7) in Examples 1-9.

| Condition | Ex. 1 | Ex. 2 | Ex. 3 | Ex. 4 | Ex. 5 |
|---|---|---|---|---|---|
| $f_1/|f_2|$ | −2.29 | −2.34 | −2.05 | −2.03 | −1.94 |
| $f_1/f_t$ | 0.53 | 0.47 | 0.39 | 0.38 | 0.36 |
| $R_2/f_w$ | 6.72 | 4.03 | 4.19 | 3.88 | 4.78 |
| $\Delta_{2G}/f_t$ | −0.24 | −0.24 | −0.21 | −0.21 | −0.22 |
| $N_{dp}$ | 1.80100 | 1.80100 | 1.80100 | 1.80100 | 1.80100 |
| $R_2/R_1$ | −0.47 | −0.41 | −0.35 | −0.47 | −0.43 |
| $\beta_2/\beta_a$ | 0.33 | 0.34 | 0.33 | 0.33 | 0.37 |

| Condition | Ex. 6 | Ex. 7 | Ex. 8 | Ex. 9 |
|---|---|---|---|---|
| $f_1/|f_2|$ | −2.01 | −2.06 | −2.00 | −1.98 |
| $f_1/f_t$ | 0.34 | 0.32 | 0.32 | 0.34 |
| $R_2/f_w$ | 4.76 | 4.50 | 4.62 | 4.73 |
| $\Delta_{2G}/f_t$ | −0.22 | −0.21 | −0.20 | −0.22 |
| $N_{dp}$ | 1.88300 | 2.00330 | 2.00069 | 1.83400 |
| $R_2/R_1$ | −0.07 | −0.18 | 0.10 | −0.33 |
| $\beta_2/\beta_a$ | 0.38 | 0.38 | 0.38 | 0.42 |

Figure 19:
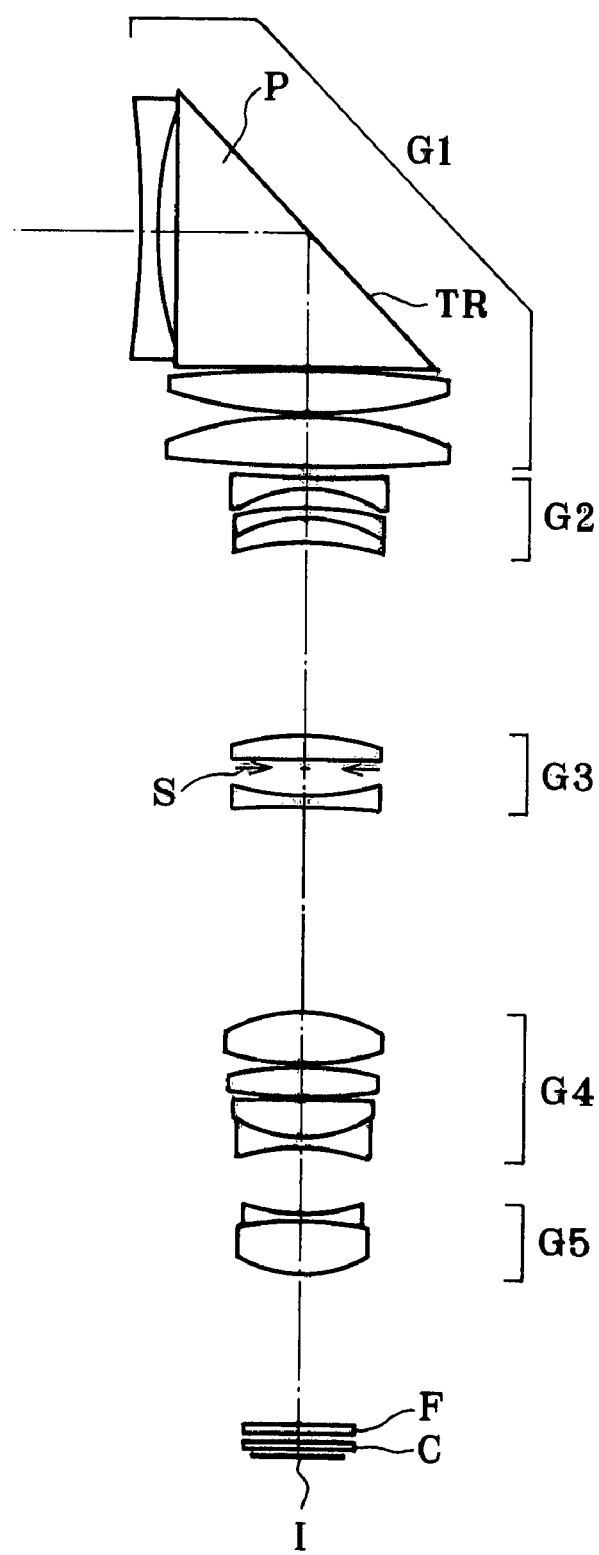
FIG. 19 is illustrative of the bent type zoom optical system of Example 9 wherein the optical path is bent in a longitudinal direction.

With the bent type zoom optical system according to each example of the invention, an optical path is bent by the prism P located in the first lens group G1 in a camera's longitudinal or transverse direction. One example is given in FIG. 19. FIG. 19 is illustrative of the optical path through the bent type zoom optical system of Example 9, which is bent in a longitudinal direction by the total-reflection plane TR of the right-angle prism P located in the first lens group G1: FIG. 19 is a sectional view as taken along the optical axis in a state where the bent type zoom optical system of Example 9 is positioned at the wide-angle end.

Figure 20:
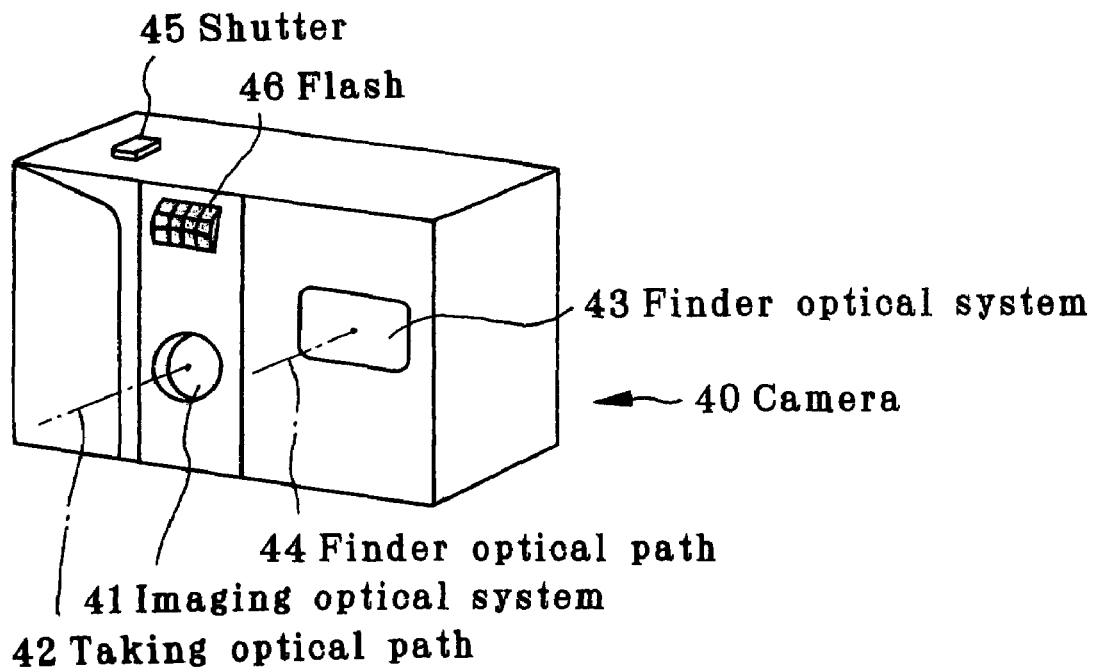
FIG. 20 is a front perspective view of the appearance of a digital camera having the bent zoom optical system of the invention built in it.
Figure 21:
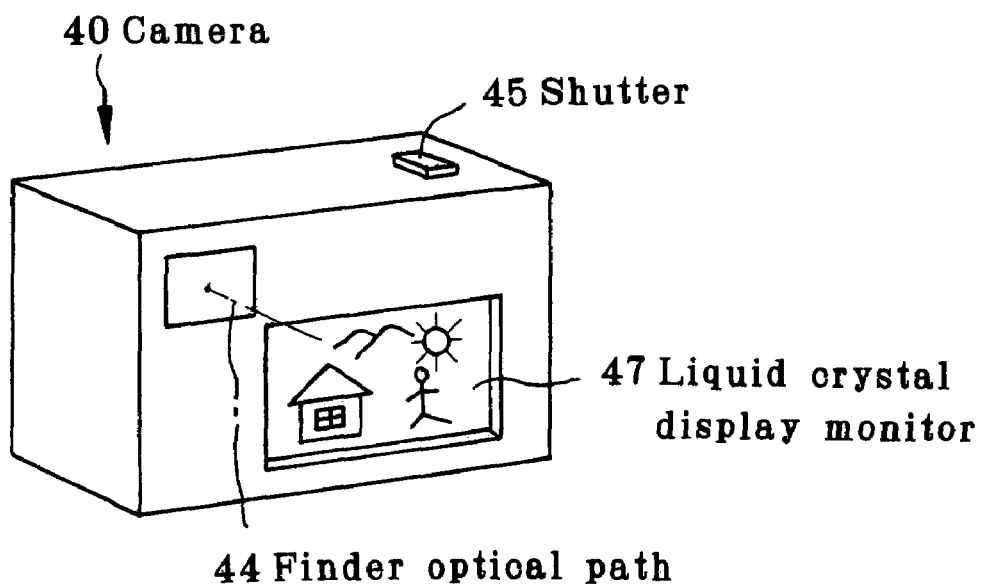
FIG. 21 is a rear perspective view of the digital camera of FIG. 20.
Figure 22:
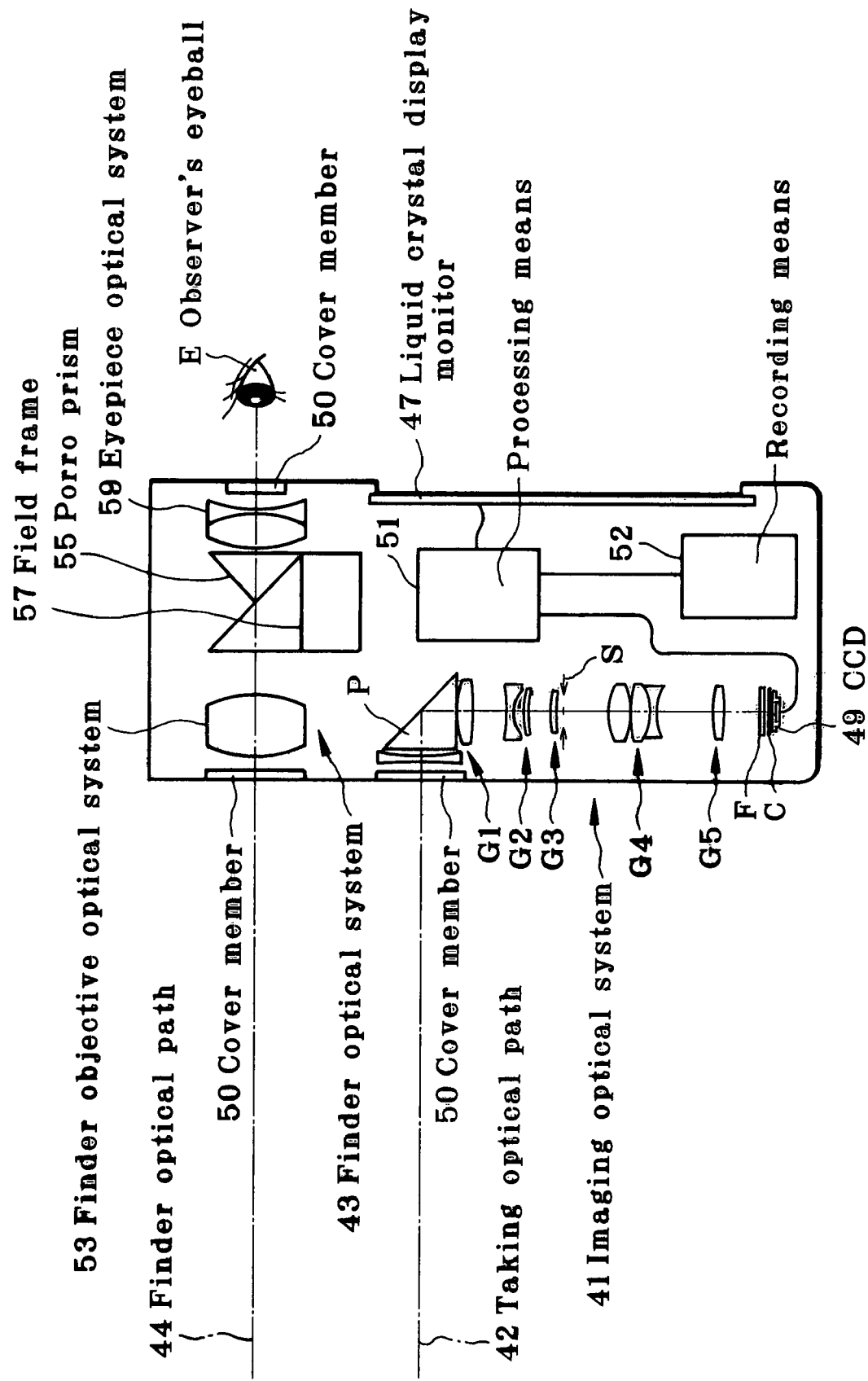
FIG. 22 is illustrative in section of the arrangement of the digital camera of FIG. 20.

FIGS. 20, 21 and 20 are illustrative in conception of the bent type zoom optical system of the invention built as a taking optical system 41 in a digital camera: FIG. 20 is a front perspective view of the construction of a digital camera 40, FIG. 21 is a rear perspective view of the same, and FIG. 22 is illustrative in section of the construction of the digital camera 40. The digital camera 40 here comprises a taking optical system 41 having a taking optical path 42, a finder optical system 43 having a finder optical path 44, a shutter 45, a flush 46, a liquid crystal display monitor 47, etc. As the shutter 45 located on the upper site of the camera 40 is pressed down, it causes taking to be implemented through the taking optical system 41, e.g., the bent type zoom optical system of Example 1. An object image formed through the taking optical system 41 is formed on the imaging plane of an imaging device 49 such as CCD or CMOS by way of a near-infrared cut filter and an optical low-pass filter F.

The object image received at the imaging device 49 such as CCD or CMOS is displayed as an electronic image on the liquid crystal display monitor (LCD) 47 mounted on the back surface of the camera by way of processing means (e.g., CPU) 51. The processing means 51 here may just as well be connected with recording means (e.g., a memory) 52 for the recording of the taken electronic image. Note here that the recording means 52 may be provided separately from the processing means 51 or, alternatively, it may be designed such that images are electronically recorded and written therein by means of a floppy (registered trademark) disc, a memory card, MO, DVD±RW, etc. The digital camera here may be designed as a silver-salt camera wherein a silver-salt film is used in place of CCD or other imaging device 49.

Further on the finder optical path 44, there is a finder objective optical system 53 mounted. An object image formed by the finder objective optical system 53 is formed on the field frame 57 of a Porro prism 55 that is an image erecting member. In the rear of the Porro prism 55, there is an eyepiece optical system 59 located for guiding an erected image to a viewer's eyeball E. Note here that cover members 50 are located on the entrance side of the taking optical system 41 and finder objective optical system 53 and on the exit side of the eyepiece optical system 59, respectively.

Figure 23:
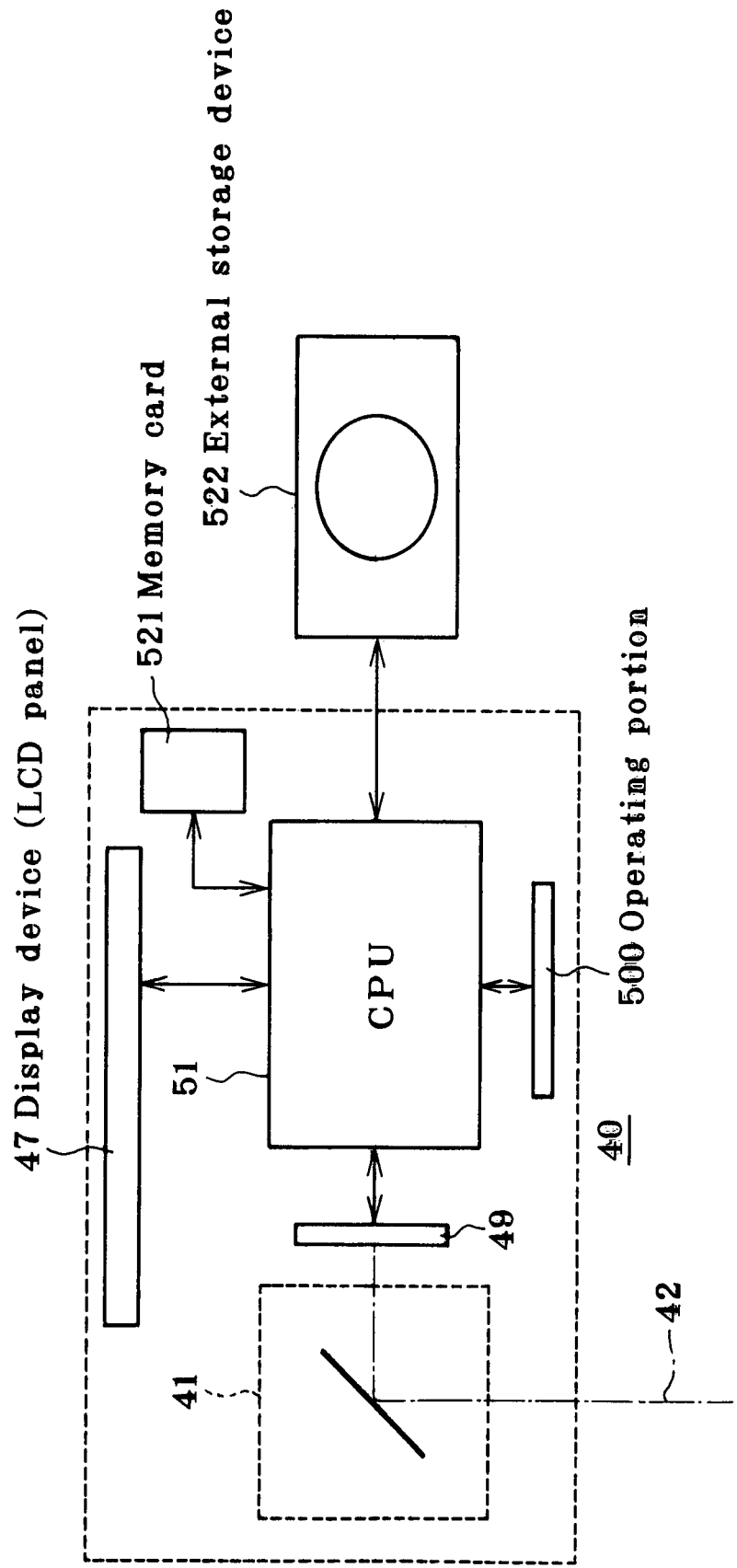
FIG. 23 is a schematic block view showing the internal construction of a main part of the digital camera depicted in FIG. 20.

FIG. 23 is a schematic block diagram of the internal construction of a main part of the aforesaid digital camera 40. An operating portion represented by the shutter is indicated by reference numeral 500. The processing means is supposed to comprise CPU 51; the imaging device is supposed to comprise CCD 49; and the recording means is supposed to comprise a memory card 521 and an external storage device (optical disc, HDD or the like) 522. As CPU 51 senses that the shutter 45 at the operation portion 500 is pressed down, it implements computation for an optimal shutter control value due to exposure control and stop control. After such computation, shutter control and stop control are gained on the basis of these control values. Any other control operation takes place as already noted.

Because, in the thus assembled digital camera 40, the taking optical system 41 has a high zoom ratio with good aberrations, and is bright with a reduced entire length, it is possible to reduce the whole size and thickness of the camera.

While it is shown in FIG. 22 and described that a plane-parallel plate is located for the cover member 50, it is contemplated that a powered lens may just as well be used.

Figure 24:
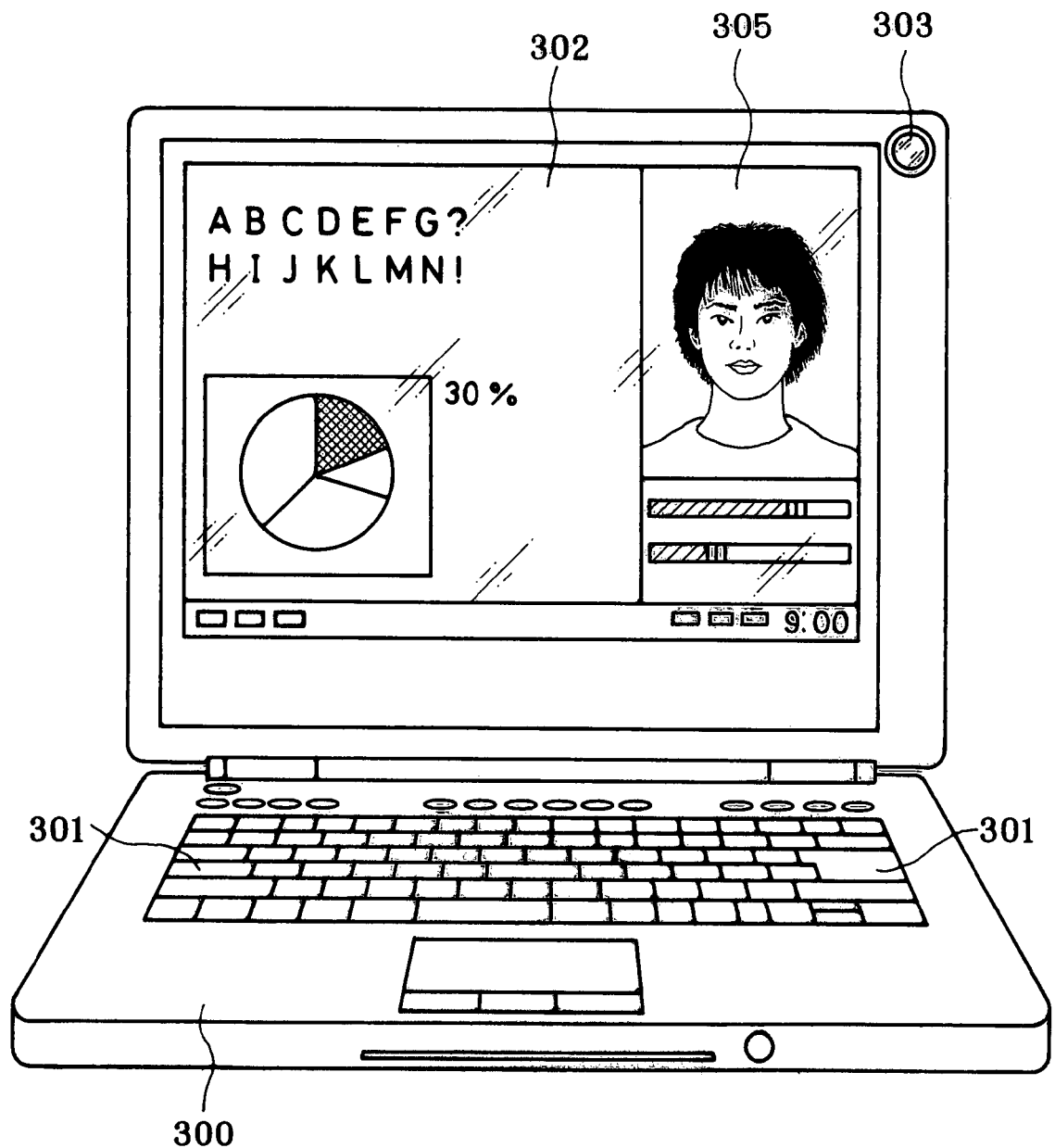
FIG. 24 is a front perspective view of a personal computer with a cover flipped open, wherein the bent type zoom optical system of the invention is built as an objective optical system.
Figure 25:
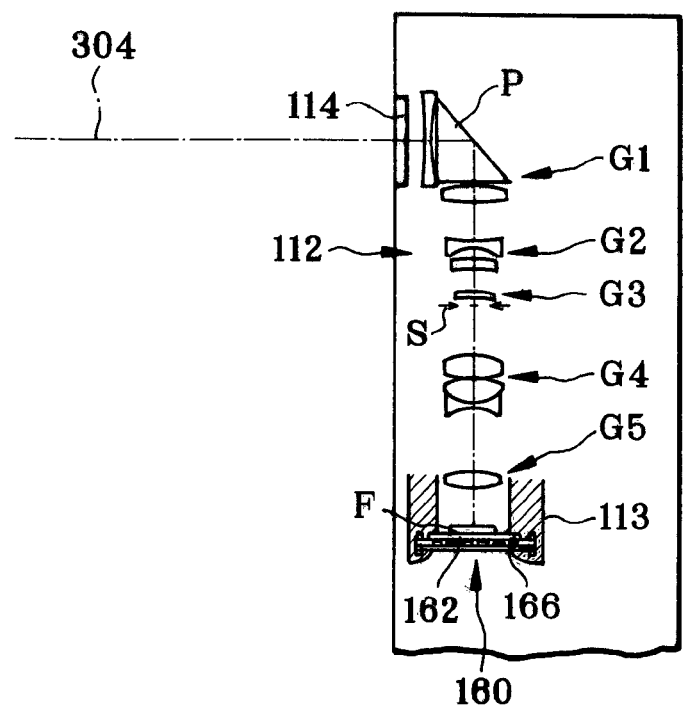
FIG. 25 is a sectional view of a taking optical system in the personal computer.
Figure 26:
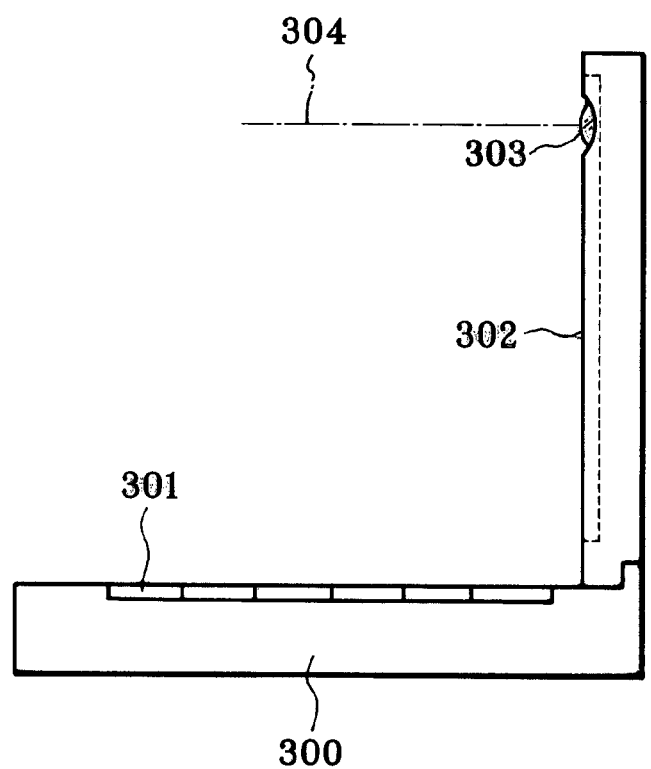
FIG. 26 is a side view of the state of FIG. 25.

FIGS. 24, 25 and 26 are illustrative of one example of an information processor wherein the bent type zoom optical system of the invention is built as an objective optical system: FIG. 24 is illustrative of a personal computer 300 with a cover flipped open; FIG. 25 is a sectional view of a taking optical system 303 in the personal computer 300; and FIG. 26 is a side view of a state shown in FIG. 24. As depicted in FIGS. 24, 25 and 26, the personal computer 300 includes a keyboard 301 adapted to let an operator enter information in it from outside, information processing or recording means not shown, a monitor 302 adapted to present information to the operator, and a taking optical system 303 adapted to take an image of the operator and surrounding images. The monitor 302 here may be a transmission type liquid crystal display device illuminated from its back surface by means of a backlight not shown, a reflection type liquid crystal display device designed to reflect light from its front to display images, a CRT display or the like. While it is shown that the taking optical system 303 is built in the right-upper portion of the monitor 302, it is contemplated that it may also be located somewhere around the monitor 302 or the keyboard 301.

The taking optical system 303 includes on a taking optical path 304 an objective lens 112 comprising the bent type zoom optical system of the invention (roughly sketched) and an imaging device chip 162 for the reception of images, all incorporated in the personal computer 300.

Additionally, an optical low-pass filter F is attached onto the imaging device chip 162 here, so that they are integrated into an imaging unit 160 that is fitted over the rear end of the lens barrel 113 of the objective lens 112 such that it is attachable thereto in one-touch operation: any alignment or inter-surface adjustment of the objective lens 112 and the imaging device chip 162 is so dispensed with that their assembling is facilitated. Note here that a cover glass 114 for the protection of the objective lens 112 is located over the opposite end (not shown) of the lens barrel 113, and any zoom lens drive mechanism, etc. in the lens barrel 113 are not depicted.

Received at the imaging device chip 162, an object image is entered in the processing means of the personal computer 300 by way of a terminal 166, and displayed as an electronic image on the monitor 302. As an example, an image 305 taken of the operator is shown in FIG. 24. This image 305 may also be displayed on a personal computer at the other end somewhere else by way of the processing means as well as the Internet or telephone line.

Figure 27A:
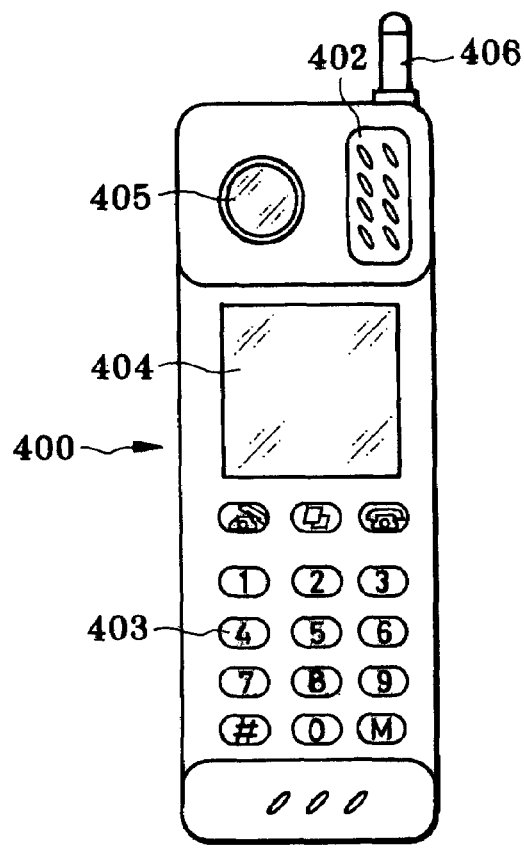
FIGS. 27(*a*) and 27(*b*) are a front and a side view of a cellular phone wherein the bent type zoom optical system of the invention is built as an objective optical system, and FIG. 27(*c*) is a sectional view of a taking optical system in it.
Figure 27B:
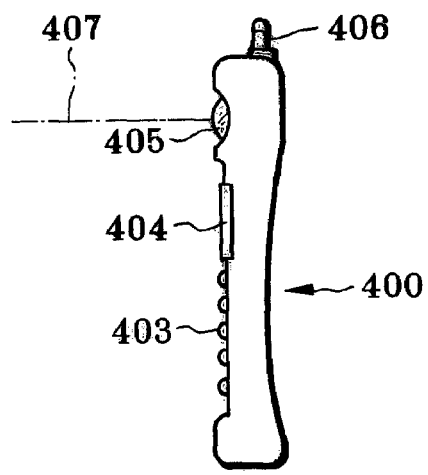
Figure 27C:
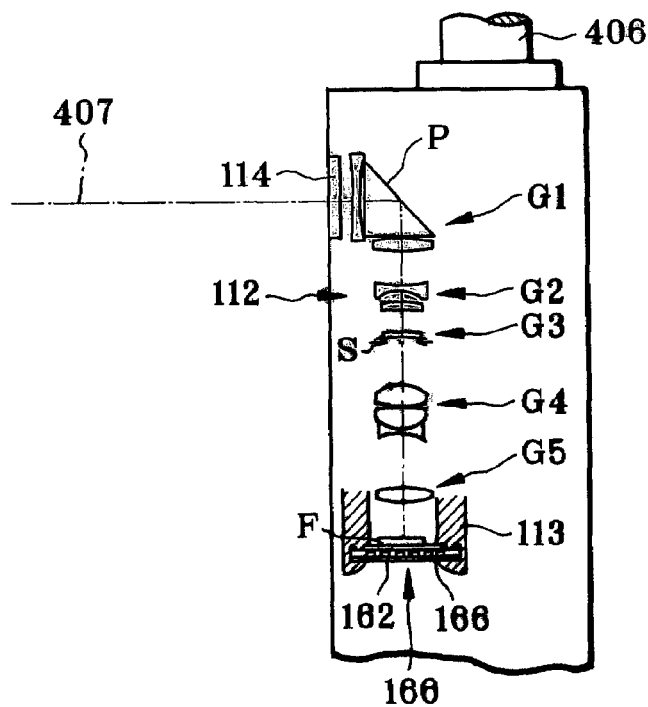

FIGS. 27(*a*), 27(*b*) and 27(*c*) are illustrative of a telephone set that is one example of the information processor in which the bent type zoom optical system of the invention is built as a taking optical system, especially a convenient-to-carry cellular phone. FIG. 27(*a*) and FIG. 27(*b*) are a front and a side view of a cellular phone 400, respectively, and FIG. 27(*c*) is a sectional view of a taking optical system 405. As shown in FIGS. 27(*a*), 27(*b*) and 27(*c*), the cellular phone 400 comprises a microphone 401 adapted to enter the voice of an operator in it as information, a speaker 402 adapted to produce the voice of the person on the other end, an input dial 403 via which the operator enters information therein, a monitor 404 adapted to display an image taken of the operator or the person on the other end and indicate information such as telephone numbers, the taking optical system 405, an antenna 406 for transmitting and receiving communication waves, and processing means (not shown) adapted to process image information, communication information, input signals, etc. Here the monitor 404 is a liquid crystal display device. It is noted that the components need not be arranged as shown. The taking optical system 405 comprises, on a taking optical path 407, an objective lens 112 comprising the bent type zoom optical system of the invention (roughly sketched) and an imaging device chip 162 for receiving an object image. These are built in the cellular phone 400.

Here an optical low-pass filter F is additionally applied onto the image pickup device chip 162 to form an integral imaging unit 160, which can be fitted over the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided over its end (not shown) with a cover glass 114 for the protection of the objective lens 112. It is here noted that drive mechanisms for the zoom lens, etc. contained in the lens barrel 113 are not shown.

An object image received at the imaging device chip 162 is entered via a terminal 166 in processing means (not shown), so that the object image can be displayed as an electronic image on the monitor 404 and/or a monitor on the other end. The processing means also include a signal processing function for converting information about the object image received at the imaging device chip 162 into transmittable signals, thereby sending the image to the person on the other end.

I claim:

1. A bent type zoom optical system comprising, in order from its object side, a positive first lens group adapted to remain fixed upon zooming, a negative second lens group adapted to move upon zooming, a positive or negative third lens group adapted to remain fixed upon zooming and having an aperture stop, a positive fourth lens group, and a positive fifth lens group, wherein said positive first lens group includes a reflecting surface, with satisfaction of the following condition:

$$0.2 < f_1/f_t < 0.65 \qquad (2)'$$

where $f_1$: a focal length of the positive first lens group having a reflecting surface, and $f_t$: a focal length of the zoom optical system at a telephoto end.

2. The bent type zoom optical system according to claim 1, characterized in that said reflecting member is formed of a plane.

3. An imaging apparatus comprising a bent type zoom optical system as recited in claim 1 or 2, and an imaging device located at a position for reception of an object image formed by said bent type zoom optical system.

4. An information processor, comprising a bent type zoom optical system as recited in claim 1 or 2, an imaging device located at a position for reception of an object image formed by said bent type zoom optical system, a CPU adapted to process electronic signals photoelectrically converted by said imaging device, an input portion adapted to receive information signals that an operator wants to enter in said CPU, a display processing means adapted to display an output from said CPU on a display apparatus, and a recording medium adapted to record an output from said CPU therein, wherein said CPU is adapted to display on the display apparatus an object image received through said bent type zoom optical system at said imaging device.

5. A portable terminal, comprising a bent type zoom optical system as recited in claim 1 or 2, an imaging device located at a position for reception of an object image formed by said bent type zoom optical system, a CPU adapted to process electronic signals photoelectrically converted by said imaging device, an input portion adapted to receive information signals that an operator wants to enter in said CPU, a display processing means adapted to display an output from said CPU on a display apparatus, and a recording medium adapted to record an output from said CPU therein, wherein said CPU is adapted to display on the display apparatus an object image received through said bent type zoom optical system at said imaging device.

6. An electronic camera apparatus comprising a bent type zoom optical system as recited in claim 1 or 2, an imaging device located at a position for reception of an object image formed by said bent type zoom optical system, a CPU adapted to process electronic signals photoelectrically converted by said imaging device, and a display device for displaying an object image received at said imaging device in a visible way, wherein a recording medium for recording image information on the object image received at said imaging device is incorporated, or inserted or de-inserted, and said CPU includes a display apparatus adapted to display on the display device an object image received at the imaging device and recording/processing means adapted to record the object image received at said imaging device in said recording medium.

7. The bent type zoom optical system according to claim 1, wherein the following conditions are satisfied:

$$1 < f_1/|f_2| < 2.8 \tag{1}$$

$$1.8 < R_2/f_w < 10 \tag{3}$$

where $f_1$: a focal length of the positive first lens group having a reflecting surface,
$f_2$: a focal length of the negative second lens group,
$R_2$: an axial radius of curvature of an image-side surface of the negative lens in the first lens group and nearest to an object side thereof, and
$f_w$: a focal length of the zoom optical system at a wide-angle end.

8. The bent type zoom optical system according to claim 1, wherein the following conditions are satisfied:

$$0 \Delta_{2G}/f_t < 0.27 \tag{4}$$

$$1 < f_1/|f_2| < 3 \tag{1'}$$

where $\Delta_{2G}$: an amount of movement of the second lens group upon zooming from a wide-angle end to a telephoto end provided that the movement from an object side to an image side is taken as +,
$f_t$: a focal length of the zoom optical system at the telephoto end,
$f_1$: a focal length of the positive first lens group having a reflecting surface, and
$f_2$: a focal length of the negative second lens group.

9. The bent type zoom optical system according to claim 1, wherein the following condition is satisfied:

$$N_{dp} < 2.0 \tag{5}$$

where $N_{dp}$: a d-line refractive index of a vitreous material used for the prism in the first lens group.

10. The bent type zoom optical system according to claim 1, wherein the following conditions are satisfied:

$$-1 \leq R_2/R_1 < 0.18 \tag{6}$$

$$0.1 < \beta 2/\beta a < 0.65 \tag{7}$$

where $R_1$: an axial radius of curvature of an object-side surface of the negative single lens L1,
$R_2$: an axial radius of curvature of an image-side surface of the negative single lens L1,
$\beta_2$: a combined focal length ratio between the first lens group and the second lens group at the wide-angle and telephoto ends, and
$\beta_a$: a focal length ratio ($f_t/f_w$) at the wide-angle and telephoto ends.

* * * * *